United States Patent
Bloom et al.

[11] Patent Number: 5,982,553
[45] Date of Patent: Nov. 9, 1999

[54] DISPLAY DEVICE INCORPORATING ONE-DIMENSIONAL GRATING LIGHT-VALVE ARRAY

[75] Inventors: David M. Bloom, Portola Valley; Asif A. Godil, Mountain View, both of Calif.

[73] Assignee: Silicon Light Machines, Sunnyvale, Calif.

[21] Appl. No.: 08/821,390

[22] Filed: Mar. 20, 1997

[51] Int. Cl.⁶ .................................................. G02B 27/10
[52] U.S. Cl. ........................................... 359/627; 359/619
[58] Field of Search .................................. 359/619, 627, 359/563, 572

[56] References Cited

U.S. PATENT DOCUMENTS

| | | | |
|---|---|---|---|
| Re. 16,767 | 10/1927 | Jenkins | 359/291 |
| Re. 25,169 | 5/1962 | Glenn | 348/764 |
| 1,525,550 | 2/1925 | Jenkins | 359/291 |
| 1,548,262 | 8/1925 | Freedman | 283/67 |
| 1,814,701 | 7/1931 | Ives | 359/462 |
| 2,415,226 | 2/1947 | Sziklai | 178/5.4 |
| 2,783,406 | 2/1957 | Vanderhooft | 313/70 |
| 2,991,690 | 7/1961 | Grey et al. | 88/16.6 |
| 3,553,364 | 1/1971 | Lee | 178/7.3 |
| 3,576,394 | 4/1971 | Lee | 178/7.3 |
| 3,600,798 | 8/1971 | Lee | 29/592 |
| 3,656,837 | 4/1972 | Sandbank | 350/161 |
| 3,781,465 | 12/1973 | Ernstoff et al. | 178/5.4 BD |
| 3,783,184 | 1/1974 | Ernstoff et al. | 178/5.4 BD |
| 3,802,769 | 4/1974 | Rotz et al. | 352/43 |
| 3,862,360 | 1/1975 | Dill et al. | 178/7.3 D |
| 3,886,310 | 5/1975 | Guldberg et al. | 178/7.5 D |
| 3,896,338 | 7/1975 | Nathanson et al. | 315/373 |
| 3,915,548 | 10/1975 | Opittek et al. | 350/3.5 |
| 3,935,499 | 1/1976 | Oess | 313/413 |
| 3,935,500 | 1/1976 | Oess et al. | 313/495 |
| 3,943,281 | 3/1976 | Keller et al. | 178/7.5 D |
| 3,947,105 | 3/1976 | Smith | 353/121 |
| 3,969,611 | 7/1976 | Fonteneau | 219/502 |
| 3,991,416 | 11/1976 | Byles et al. | 340/324 R |
| 4,001,663 | 1/1977 | Bray | 321/2 |

(List continued on next page.)

FOREIGN PATENT DOCUMENTS

| | | | |
|---|---|---|---|
| 0 261 901 A2 | 3/1988 | European Pat. Off. | G09G 3/36 |
| 0 306 308 A2 | 3/1989 | European Pat. Off. | H04N 3/14 |
| 0 627 644 A3 | 9/1990 | European Pat. Off. | G02B 27/00 |
| 0 417 039 A1 | 3/1991 | European Pat. Off. | G03B 21/20 |
| 0 488 326 A3 | 6/1992 | European Pat. Off. | G09G 3/28 |
| 0 528 646 A1 | 2/1993 | European Pat. Off. | G09G 3/02 |

(List continued on next page.)

OTHER PUBLICATIONS

Apte et al., "Grating Light Valves For High Resolution Displays", Solid State Sensor and Actuators Workshop, Hilton Head Island, SC, Jun., 1994.

R. Apte, "Grating Light Valves For High Resolution Displays," Jun., 1994.

O. Solgaard, "Integrated Semiconductor Light Modulators For Fiber–Optic And Display Applications," Feb., 1992.

J. Neff, "Two–Dimensional Spatial Light Modulators: A Tutorial", Proceedings of the IEEE, vol. 78, No. 5, pp. 826–855, May, 1990.

(List continued on next page.)

*Primary Examiner*—Georgia Epps
*Assistant Examiner*—Ricky Mack
*Attorney, Agent, or Firm*—Haverstock & Owens LLP; R. Russel Austin

[57] ABSTRACT

A display system for providing a two dimensional image includes an essentially one dimensional light valve array. The diffractive light valve array includes modulator elements which diffract or reflect light incident thereon to an extent determined by an image element to be represented. The display system is arranged such diffracted light from the light-valve array passes through a magnifying lens and is separated from the reflected light from the array. A magnified virtual image of the array formed by the diffracted light is viewed through the magnifying lens. A scanning arrangement between the viewer and the magnifying lens scans the image of the light-valve array across the field of view of the viewer sufficiently quickly that the viewer perceives the scanned image as a two-dimensional image. In another arrangement a printer is formed by scanning a real image of the diffractive light valve array over a printing or recording medium.

40 Claims, 8 Drawing Sheets

U.S. PATENT DOCUMENTS

| | | | |
|---|---|---|---|
| 4,006,968 | 2/1977 | Ernstoff et al. | 350/160 LC |
| 4,009,939 | 3/1977 | Okano | 350/162 SF |
| 4,012,116 | 3/1977 | Yevick | 350/132 |
| 4,017,158 | 4/1977 | Booth | 350/162 SF |
| 4,020,381 | 4/1977 | Oess et al. | 313/302 |
| 4,067,129 | 1/1978 | Abramson et al. | 40/563 |
| 4,084,437 | 4/1978 | Finnegan | 73/361 |
| 4,090,219 | 5/1978 | Ernstoff et al. | 358/59 |
| 4,093,346 | 6/1978 | Nishino et al. | 350/162 SF |
| 4,093,921 | 6/1978 | Buss | 325/459 |
| 4,093,922 | 6/1978 | Buss | 325/459 |
| 4,100,579 | 7/1978 | Ernstoff | 358/230 |
| 4,127,322 | 11/1978 | Jacobson et al. | 353/31 |
| 4,135,502 | 1/1979 | Peck | 128/76.5 |
| 4,139,257 | 2/1979 | Matsumoto | 350/6.1 |
| 4,163,570 | 8/1979 | Greenaway | 283/8 A |
| 4,184,700 | 1/1980 | Greenaway | 283/6 |
| 4,185,891 | 1/1980 | Kaestner | 350/167 |
| 4,195,915 | 4/1980 | Lichty et al. | 350/345 |
| 4,205,428 | 6/1980 | Ernstoff et al. | 29/592 R |
| 4,211,918 | 7/1980 | Nyfeler et al. | 235/454 |
| 4,223,050 | 9/1980 | Nyfeler et al. | 427/163 |
| 4,225,913 | 9/1980 | Bray | 363/97 |
| 4,250,217 | 2/1981 | Greenaway | 428/161 |
| 4,250,393 | 2/1981 | Greenaway | 250/566 |
| 4,256,787 | 3/1981 | Shaver et al. | 428/1 |
| 4,311,999 | 1/1982 | Upton et al. | 340/755 |
| 4,327,411 | 4/1982 | Turner | 364/900 |
| 4,327,966 | 5/1982 | Bloom | 350/162 R |
| 4,338,660 | 7/1982 | Kelley et al. | 364/200 |
| 4,343,535 | 8/1982 | Bleha, Jr. | 350/342 |
| 4,361,384 | 11/1982 | Bosserman | 350/174 |
| 4,374,397 | 2/1983 | Mir | 358/75 |
| 4,389,086 | 6/1983 | Hori et al. | 350/339 R |
| 4,408,884 | 10/1983 | Kleinknecht et al. | 356/355 |
| 4,418,397 | 11/1983 | Brantingham et al. | 364/900 |
| 4,420,717 | 12/1983 | Wallace et al. | 318/696 |
| 4,430,584 | 2/1984 | Someshwar et al. | 307/465 |
| 4,440,839 | 4/1984 | Mottier | 430/2 |
| 4,443,819 | 4/1984 | Funada et al. | 358/236 |
| 4,443,845 | 4/1984 | Hamilton et al. | 364/200 |
| 4,447,881 | 5/1984 | Brantingham et al. | 364/488 |
| 4,454,591 | 6/1984 | Lou | 364/900 |
| 4,468,725 | 8/1984 | Venturini | 363/160 |
| 4,484,188 | 11/1984 | Ott | 340/728 |
| 4,492,435 | 1/1985 | Banton et al. | 350/360 |
| 4,503,494 | 3/1985 | Hamilton et al. | 364/200 |
| 4,556,378 | 12/1985 | Nyfeler et al. | 425/143 |
| 4,561,044 | 12/1985 | Ogura et al. | 362/84 |
| 4,566,935 | 1/1986 | Hornbeck | 156/626 |
| 4,571,041 | 2/1986 | Gaudyn | 353/10 |
| 4,571,603 | 2/1986 | Hornbeck et al. | 346/160 |
| 4,590,548 | 5/1986 | Maytum | 363/161 |
| 4,594,501 | 6/1986 | Culley et al. | 219/492 |
| 4,596,992 | 6/1986 | Hornbeck | 346/76 PH |
| 4,615,595 | 10/1986 | Hornbeck | 353/122 |
| 4,623,219 | 11/1986 | Trias | 350/351 |
| 4,636,866 | 1/1987 | Hattori | 358/236 |
| 4,645,881 | 2/1987 | LeToumelin et al. | 379/252 |
| 4,646,158 | 2/1987 | Ohno et al. | 358/236 |
| 4,652,932 | 3/1987 | Miyajima et al. | 358/236 |
| 4,655,539 | 4/1987 | Caulfield et al. | 350/3.6 |
| 4,662,746 | 5/1987 | Hornbeck | 350/269 |
| 4,663,670 | 5/1987 | Ito et al. | 358/245 |
| 4,687,326 | 8/1987 | Corby Jr. | 356/5 |
| 4,709,995 | 12/1987 | Kuribayashi et al. | 350/350 S |
| 4,710,732 | 12/1987 | Hornbeck | 332/7.51 |
| 4,714,326 | 12/1987 | Usui et al. | 350/485 |
| 4,719,507 | 1/1988 | Bos | 358/92 |
| 4,722,593 | 2/1988 | Shimazaki | 350/336 |
| 4,728,185 | 3/1988 | Thomas | 353/122 |
| 4,744,633 | 5/1988 | Sheiman | 350/132 |
| 4,747,671 | 5/1988 | Takahashi et al. | 350/336 |
| 4,751,509 | 6/1988 | Kubota et al. | 340/784 |
| 4,761,253 | 8/1988 | Antes | 264/1.3 |
| 4,772,094 | 9/1988 | Sheiman | 350/133 |
| 4,797,694 | 1/1989 | Agostinelli et al. | 346/160 |
| 4,801,194 | 1/1989 | Agostinelli et al. | 350/356 |
| 4,803,560 | 2/1989 | Matsunaga et al. | 358/236 |
| 4,807,965 | 2/1989 | Garakani | 350/131 |
| 4,809,078 | 2/1989 | Yabe et al. | 358/236 |
| 4,811,210 | 3/1989 | McAulay | 364/200 |
| 4,814,759 | 3/1989 | Gombrich et al. | 340/771 |
| 4,827,391 | 5/1989 | Sills | 363/41 |
| 4,829,365 | 5/1989 | Eichenlaub | 358/3 |
| 4,856,863 | 8/1989 | Sampsell et al. | 350/96.16 |
| 4,856,869 | 8/1989 | Sakata et al. | 350/162.18 |
| 4,859,012 | 8/1989 | Cohn | 350/96.24 |
| 4,866,488 | 9/1989 | Frensley | 357/4 |
| 4,915,463 | 4/1990 | Barbee, Jr. | 350/1.1 |
| 4,915,479 | 4/1990 | Clarke | 350/345 |
| 4,934,773 | 6/1990 | Becker | 350/6.6 |
| 4,952,925 | 8/1990 | Haastert | 340/784 |
| 4,954,789 | 9/1990 | Sampsell | 330/4.3 |
| 4,956,619 | 9/1990 | Hornbeck | 330/4.3 |
| 4,978,202 | 12/1990 | Yang | 350/331 R |
| 4,982,184 | 1/1991 | Kirkwood | 340/783 |
| 4,984,824 | 1/1991 | Antes et al. | 283/91 |
| 5,003,300 | 3/1991 | Wells | 340/705 |
| 5,013,141 | 5/1991 | Sakata | 350/348 |
| 5,018,256 | 5/1991 | Hornbeck | 29/25.01 |
| 5,022,750 | 6/1991 | Flasck | 353/31 |
| 5,024,494 | 6/1991 | Williams et al. | 350/3.6 |
| 5,028,939 | 7/1991 | Hornbeck et al. | 346/160 |
| 5,035,473 | 7/1991 | Kuwayama et al. | 350/3.7 |
| 5,037,173 | 8/1991 | Sampsell et al. | 385/17 |
| 5,041,851 | 8/1991 | Nelson | 346/160 |
| 5,048,077 | 9/1991 | Wells et al. | 379/96 |
| 5,058,992 | 10/1991 | Takahashi | 359/567 |
| 5,060,058 | 10/1991 | Goldenberg et al. | 358/60 |
| 5,061,049 | 10/1991 | Hornbeck | 359/224 |
| 5,072,239 | 12/1991 | Mitcham et al. | 346/108 |
| 5,072,418 | 12/1991 | Boutaud et al. | 364/15.06 |
| 5,079,544 | 1/1992 | DeMond et al. | 340/701 |
| 5,083,857 | 1/1992 | Hornbeck | 359/291 |
| 5,089,903 | 2/1992 | Kuwayama et al. | 359/15 |
| 5,096,279 | 3/1992 | Hornbeck et al. | 359/230 |
| 5,099,353 | 3/1992 | Hornbeck | 359/291 |
| 5,101,184 | 3/1992 | Antes | 235/454 |
| 5,101,236 | 3/1992 | Nelson et al. | 355/229 |
| 5,105,207 | 4/1992 | Nelson | 346/160 |
| 5,105,299 | 4/1992 | Anderson et al. | 359/223 |
| 5,105,369 | 4/1992 | Nelson | 364/525 |
| 5,113,272 | 5/1992 | Reamey | 359/53 |
| 5,113,285 | 5/1992 | Franklin et al. | 359/465 |
| 5,119,204 | 6/1992 | Hashimoto et al. | 358/254 |
| 5,121,343 | 6/1992 | Faris | 395/111 |
| 5,128,660 | 7/1992 | DeMond et al. | 340/707 |
| 5,129,716 | 7/1992 | Holakovszky et al. | 351/50 |
| 5,132,812 | 7/1992 | Takahashi et al. | 359/9 |
| 5,142,303 | 8/1992 | Nelson | 346/108 |
| 5,142,405 | 8/1992 | Hornbeck | 359/226 |
| 5,142,677 | 8/1992 | Ehlig et al. | 395/650 |
| 5,148,157 | 9/1992 | Florence | 340/783 |
| 5,148,506 | 9/1992 | McDonald | 385/16 |
| 5,151,718 | 9/1992 | Nelson | 346/160 |
| 5,155,604 | 10/1992 | Miekka et al. | 359/2 |

| | | | | | | | |
|---|---|---|---|---|---|---|---|
| 5,155,615 | 10/1992 | Tagawa | 359/213 | 5,319,792 | 6/1994 | Ehlig et al. | 395/800 |
| 5,155,778 | 10/1992 | Magel et al. | 385/18 | 5,321,416 | 6/1994 | Bassett et al. | 345/8 |
| 5,155,812 | 10/1992 | Ehlig et al. | 395/275 | 5,323,002 | 6/1994 | Sampsell et al. | 250/252.1 |
| 5,159,485 | 10/1992 | Nelson | 359/291 | 5,325,116 | 6/1994 | Sampsell | 346/108 |
| 5,161,042 | 11/1992 | Hamada | 359/41 | 5,327,286 | 7/1994 | Sampsell et al. | 359/561 |
| 5,162,787 | 11/1992 | Thompson et al. | 340/794 | 5,330,878 | 7/1994 | Nelson | 430/311 |
| 5,165,013 | 11/1992 | Faris | 395/104 | 5,331,454 | 7/1994 | Hornbeck | 359/224 |
| 5,168,406 | 12/1992 | Nelson | 359/855 | 5,339,116 | 8/1994 | Urbanus et al. | 348/716 |
| 5,170,156 | 12/1992 | DeMond et al. | 340/794 | 5,339,177 | 8/1994 | Jenkins et al. | 359/35 |
| 5,170,269 | 12/1992 | Lin et al. | 359/9 | 5,345,521 | 9/1994 | McDonald et al. | 385/19 |
| 5,170,283 | 12/1992 | O'Brien et al. | 359/291 | 5,347,321 | 9/1994 | Gove | 348/663 |
| 5,172,161 | 12/1992 | Nelson | 355/200 | 5,347,378 | 9/1994 | Handschy et al. | 359/53 |
| 5,172,262 | 12/1992 | Hornbeck | 359/223 | 5,347,433 | 9/1994 | Sedlmayr | 362/32 |
| 5,178,728 | 1/1993 | Boysel et al. | 156/656 | 5,348,619 | 9/1994 | Bohannon et al. | 156/664 |
| 5,179,274 | 1/1993 | Sampsell | 250/208.2 | 5,349,687 | 9/1994 | Ehlig et al. | 395/800 |
| 5,179,367 | 1/1993 | Shimizu | 340/700 | 5,351,052 | 9/1994 | D'Hont et al. | 342/42 |
| 5,181,231 | 1/1993 | Parikh et al. | 377/26 | 5,357,369 | 10/1994 | Pilling et al. | 359/462 |
| 5,182,665 | 1/1993 | O'Callaghan et al. | 359/95 | 5,359,349 | 10/1994 | Jambor et al. | 345/168 |
| 5,192,864 | 3/1993 | McEwen et al. | 250/234 | 5,363,220 | 11/1994 | Kuwayama et al. | 359/3 |
| 5,192,946 | 3/1993 | Thompson et al. | 340/794 | 5,365,283 | 11/1994 | Doherty et al. | 348/743 |
| 5,202,785 | 4/1993 | Nelson | 359/214 | 5,367,585 | 11/1994 | Ghezzo et al. | 385/23 |
| 5,206,629 | 4/1993 | DeMond et al. | 340/719 | 5,371,543 | 12/1994 | Anderson | 348/270 |
| 5,212,555 | 5/1993 | Stoltz | 358/206 | 5,371,618 | 12/1994 | Tai et al. | 359/53 |
| 5,212,582 | 5/1993 | Nelson | 359/224 | 5,382,961 | 1/1995 | Gale, Jr. | 345/108 |
| 5,214,419 | 5/1993 | DeMond et al. | 340/794 | 5,387,924 | 2/1995 | Gale, Jr. et al. | 345/108 |
| 5,214,420 | 5/1993 | Thompson et al. | 340/795 | 5,389,182 | 2/1995 | Mignardi | 156/344 |
| 5,216,537 | 6/1993 | Hornbeck | 359/291 | 5,392,140 | 2/1995 | Ezra et al. | 359/41 |
| 5,221,982 | 6/1993 | Faris | 359/93 | 5,392,151 | 2/1995 | Nelson | 359/223 |
| 5,226,099 | 7/1993 | Mignardi et al. | 385/19 | 5,398,071 | 3/1995 | Gove et al. | 348/558 |
| 5,231,363 | 7/1993 | Sano et al. | 332/109 | 5,404,485 | 4/1995 | Ban | 395/425 |
| 5,231,388 | 7/1993 | Stoltz | 340/783 | 5,410,315 | 4/1995 | Huber | 342/42 |
| 5,231,432 | 7/1993 | Glenn | 353/31 | 5,411,769 | 5/1995 | Hornbeck | 427/534 |
| 5,233,456 | 8/1993 | Nelson | 359/214 | 5,412,186 | 5/1995 | Gale | 219/679 |
| 5,237,340 | 8/1993 | Nelson | 346/108 | 5,418,584 | 5/1995 | Larson | 353/122 |
| 5,237,435 | 8/1993 | Kurematsu et al. | 359/41 | 5,420,655 | 5/1995 | Shimizu | 353/33 |
| 5,240,818 | 8/1993 | Mignardi et al. | 430/321 | 5,430,524 | 7/1995 | Nelson | 355/200 |
| 5,245,686 | 9/1993 | Faris et al. | 385/120 | 5,435,876 | 7/1995 | Alfaro et al. | 156/247 |
| 5,247,180 | 9/1993 | Mitcham et al. | 250/492.1 | 5,442,411 | 8/1995 | Urbanus et al. | 348/771 |
| 5,247,593 | 9/1993 | Lin et al. | 385/17 | 5,442,414 | 8/1995 | Janssen et al. | 353/98 |
| 5,254,980 | 10/1993 | Hendrix et al. | 345/84 | 5,444,566 | 8/1995 | Gale et al. | 359/291 |
| 5,255,100 | 10/1993 | Urbanus | 358/231 | 5,445,559 | 8/1995 | Gale et al. | 451/388 |
| 5,256,869 | 10/1993 | Lin et al. | 250/201.9 | 5,446,479 | 8/1995 | Thompson et al. | 345/139 |
| 5,262,000 | 11/1993 | Welbourne et al. | 156/643 | 5,447,600 | 9/1995 | Webb | 216/2 |
| 5,272,473 | 12/1993 | Thompson et al. | 345/7 | 5,448,314 | 9/1995 | Heimbuch et al. | 348/743 |
| 5,278,652 | 1/1994 | Urbanus et al. | 358/160 | 5,448,546 | 9/1995 | Pauli | 369/112 |
| 5,278,925 | 1/1994 | Boysel et al. | 385/14 | 5,450,088 | 9/1995 | Meier et al. | 342/51 |
| 5,280,277 | 1/1994 | Hornbeck | 345/108 | 5,450,219 | 9/1995 | Gold et al. | 359/40 |
| 5,281,957 | 1/1994 | Schoolman | 345/8 | 5,451,103 | 9/1995 | Hatanaka et al. | 353/31 |
| 5,285,196 | 2/1994 | Gale, Jr. | 345/108 | 5,452,024 | 9/1995 | Sampsell | 348/755 |
| 5,285,407 | 2/1994 | Gale et al. | 365/189.11 | 5,452,138 | 9/1995 | Mignardi et al. | 359/855 |
| 5,287,096 | 2/1994 | Thompson et al. | 345/147 | 5,453,747 | 9/1995 | D'Hont et al. | 342/42 |
| 5,287,215 | 2/1994 | Warde et al. | 359/293 | 5,453,778 | 9/1995 | Venkateswar et al. | 347/239 |
| 5,289,172 | 2/1994 | Gale, Jr. et al. | 345/108 | 5,453,803 | 9/1995 | Shapiro et al. | 353/119 |
| 5,291,317 | 3/1994 | Newswanger | 359/15 | 5,454,906 | 10/1995 | Baker et al. | 216/66 |
| 5,291,473 | 3/1994 | Pauli | 369/112 | 5,455,602 | 10/1995 | Tew | 347/239 |
| 5,293,511 | 3/1994 | Poradish et al. | 257/434 | 5,457,493 | 10/1995 | Leddy et al. | 348/164 |
| 5,296,891 | 3/1994 | Vogt et al. | 355/67 | 5,457,566 | 10/1995 | Sampsell et al. | 359/292 |
| 5,296,950 | 3/1994 | Lin et al. | 359/9 | 5,458,716 | 10/1995 | Alfaro et al. | 156/245 |
| 5,299,037 | 3/1994 | Sakata | 359/41 | 5,459,492 | 10/1995 | Venkateswar | 347/253 |
| 5,299,289 | 3/1994 | Omae et al. | 359/95 | 5,459,528 | 10/1995 | Pettitt | 348/568 |
| 5,301,062 | 4/1994 | Takahashi et al. | 359/567 | 5,459,592 | 10/1995 | Shibatani et al. | 359/40 |
| 5,303,055 | 4/1994 | Hendrix et al. | 348/761 | 5,459,610 | 10/1995 | Bloom et al. | 359/572 |
| 5,307,056 | 4/1994 | Urbanus | 340/189 | 5,461,410 | 10/1995 | Venkateswar et al. | 347/240 |
| 5,307,185 | 4/1994 | Jones et al. | 359/41 | 5,461,411 | 10/1995 | Florence et al. | 347/240 |
| 5,311,349 | 5/1994 | Anderson et al. | 359/223 | 5,461,547 | 10/1995 | Ciupke et al. | 362/31 |
| 5,311,360 | 5/1994 | Bloom et al. | 359/572 | 5,463,347 | 10/1995 | Jones et al. | 330/253 |
| 5,312,513 | 5/1994 | Florence et al. | 156/643 | 5,465,175 | 11/1995 | Woodgate et al. | 359/463 |
| 5,313,479 | 5/1994 | Florence | 372/26 | 5,467,106 | 11/1995 | Salomon | 345/87 |
| 5,313,648 | 5/1994 | Ehlig et al. | 395/800 | 5,467,138 | 11/1995 | Gove | 348/452 |
| 5,315,418 | 5/1994 | Sprague et al. | 359/41 | 5,467,146 | 11/1995 | Huang et al. | 348/743 |
| 5,319,214 | 6/1994 | Gregory et al. | 250/504 R | 5,469,302 | 11/1995 | Lim | 359/846 |
| 5,319,789 | 6/1994 | Ehlig et al. | 395/800 | 5,471,341 | 11/1995 | Warde et al. | 359/293 |

| | | | |
|---|---|---|---|
| 5,481,118 | 1/1996 | Tew | 250/551 |
| 5,482,564 | 1/1996 | Douglas et al. | 134/18 |
| 5,482,818 | 1/1996 | Nelson | 430/394 |
| 5,483,307 | 1/1996 | Anderson | 353/98 |
| 5,485,172 | 1/1996 | Sawachika et al. | 345/8 |
| 5,485,304 | 1/1996 | Kaeriyama | 359/291 |
| 5,485,354 | 1/1996 | Ciupke et al. | 362/31 |
| 5,486,698 | 1/1996 | Hanson et al. | 250/332 |
| 5,486,841 | 1/1996 | Hara et al. | 345/8 |
| 5,486,946 | 1/1996 | Jachimowicz et al. | 359/263 |
| 5,488,431 | 1/1996 | Gove et al. | 348/716 |
| 5,489,952 | 2/1996 | Gove et al. | 348/771 |
| 5,490,009 | 2/1996 | Venkateswar et al. | 359/291 |
| 5,491,510 | 2/1996 | Gove | 348/77 |
| 5,491,715 | 2/1996 | Flaxl | 375/344 |
| 5,497,172 | 3/1996 | Doherty et al. | 345/85 |
| 5,497,197 | 3/1996 | Gove et al. | 348/388 |
| 5,497,262 | 3/1996 | Kaeriyama | 359/223 |
| 5,499,060 | 3/1996 | Gove et al. | 348/651 |
| 5,499,062 | 3/1996 | Urbanus | 348/771 |
| 5,500,761 | 3/1996 | Goossen et al. | 359/290 |
| 5,502,481 | 3/1996 | Dentinger et al. | 348/51 |
| 5,504,504 | 4/1996 | Markandey et al. | 345/214 |
| 5,504,514 | 4/1996 | Nelson | 347/130 |
| 5,504,575 | 4/1996 | Stafford | 356/330 |
| 5,504,614 | 4/1996 | Webb et al. | 359/223 |
| 5,506,171 | 4/1996 | Leonard et al. | 437/187 |
| 5,506,597 | 4/1996 | Thompson et al. | 345/85 |
| 5,506,720 | 4/1996 | Yoon | 359/224 |
| 5,508,750 | 4/1996 | Hewlett et al. | 348/558 |
| 5,508,840 | 4/1996 | Vogel et al. | 359/291 |
| 5,508,841 | 4/1996 | Lin et al. | 359/318 |
| 5,510,824 | 4/1996 | Nelson | 347/239 |
| 5,512,374 | 4/1996 | Wallace et al. | 428/422 |
| 5,512,748 | 4/1996 | Hanson | 250/332 |
| 5,515,076 | 5/1996 | Thompson et al. | 345/139 |
| 5,516,125 | 5/1996 | McKenna | 279/3 |
| 5,517,340 | 5/1996 | Doany et al. | 359/41 |
| 5,517,347 | 5/1996 | Sampsell | 359/224 |
| 5,517,359 | 5/1996 | Gelbart | 359/623 |
| 5,519,450 | 5/1996 | Urbanus et al. | 348/600 |
| 5,521,748 | 5/1996 | Sarraf | 359/321 |
| 5,523,803 | 6/1996 | Urbanus et al. | 348/771 |
| 5,523,878 | 6/1996 | Wallace et al. | 359/290 |
| 5,523,881 | 6/1996 | Florence et al. | 359/561 |
| 5,524,155 | 6/1996 | Weaver | 385/24 |
| 5,539,422 | 7/1996 | Heacock et al. | 345/8 |
| 5,668,611 | 9/1997 | Ernstoff et al. | 348/771 |
| 5,742,373 | 4/1998 | Alvelda | 349/204 |

FOREIGN PATENT DOCUMENTS

| | | | |
|---|---|---|---|
| 0 530 760 A2 | 3/1993 | European Pat. Off. | G09G 3/34 |
| 0 550 189 A1 | 7/1993 | European Pat. Off. | G02G 1/315 |
| 0 610 665 A1 | 8/1994 | European Pat. Off. | G09G 3/34 |
| 0 627 644 A2 | 12/1994 | European Pat. Off. | G02B 27/00 |
| 0 627 850 A1 | 12/1994 | European Pat. Off. | H04N 5/64 |
| 0 643 314 A2 | 3/1995 | European Pat. Off. | G02B 27/00 |
| 0 654 777 A1 | 5/1995 | European Pat. Off. | G09G 3/34 |
| 0 658 868 A1 | 6/1995 | European Pat. Off. | G09G 3/34 |
| 0 689 078 A1 | 12/1995 | European Pat. Off. | G02B 26/08 |
| 0 801 319 A1 | 10/1997 | European Pat. Off. | G02B 26/00 |
| 63-305323 | 12/1988 | Japan | G02F 1/13 |
| 2-219092 | 8/1990 | Japan | G09G 3/28 |
| 2 118 365 | 10/1983 | United Kingdom | H01L 27/13 |
| 2 266 385 | 10/1993 | United Kingdom | G02B 23/10 |
| WO 92/12506 | 7/1992 | WIPO | G09F 9/37 |
| WO 93/02269 | 2/1993 | WIPO | E06B 5/10 |
| WO 93/09472 | 5/1993 | WIPO | G03F 7/20 |
| WO 93/18428 | 9/1993 | WIPO | G02B 27/00 |
| WO 95/11473 | 4/1995 | WIPO | G02B 27/00 |
| WO 96/41217 | 12/1996 | WIPO | G02B 5/18 |
| WO 96/41224 | 12/1996 | WIPO | G02B 19/00 |
| WO 97/26569 | 7/1997 | WIPO | G02B 5/18 |

OTHER PUBLICATIONS

Gerhard–Multhaupt, "Viscoelastic Spatial Light Modulators and Schlieren–Optical Systems for HDTV Projection Displays", SPIE vol. 1255 Large Screen Projection Displays II, pp. 69–78, 1990.

Gerhard–Multhaupt, "Light–Valve Technologies for High––Definition Television Projection Displays", Displays, vol. 12, No. 3/4, pp. 115–128, 1991.

Alvelda et al., "Ferroelectric Microdisplays Using Distortion–Compensated Pixel Layouts," SID 95 Digest, pp. 931–933, 1995.

Phillip Alvelda, "High–Efficiency Color Microdisplays," SID 95 Digest, pp. 307–311, 1995.

Worboys et al., "Miniature Display Technology for Integrated Helmut Systems," GEC Journal of Research, vol. 10, No. 2, pp.111–118, 1993.

Farn et al., "Color Separation by use of Binary Optics," Optics Letters, vol. 18:15, pp. 1214–1216, 1993.

Phillip Alvelda, "VLSI Microdisplays and Optoelectric Technology," MIT, pp. 1–93, 1995.

Phillip Alvelda, "VLSI Microdisplay Technology," MIT, Oct. 14, 1994.

Solgaard et al., "Deformable Grating Optical Modulator," Optics letters, vol. 17, No. 9, New York, USA, pp. 688–690, May 1, 1992.

Tepe et al., "Visoelastic Spatial Light modulator with Active Matrix Addressing," Applied Optics, vol. 28, No. 22, New York, USA, pp. 4826–4834, Nov. 15, 1989.

Brinker et al., "Deformation Behavior of Thin Viscoelastic Layers Used in an Active–Matrix–Addressed Spatial Light Modulator," SPIE vol. 1018, pp. 79–85, Germany, 1988.

T. Utsunomiya and H. Sato, "Electrically Deformable Echellette Grating and its Application to Tunable Laser Resonator," Electronics and Communications in Japan, vol. 63–c, No. 10, pp. 94–100, Japan, 1980.

T. Iwai et al., "Real–time Profiling of a Pure Phase Object Using an Auto–Wigner Distribution Function," Optics Communications, vol. 95, No. 4–6, pp. 199–204, Jan. 15, 1993.

Russick et al., "Supercritical Carbon Dioxide Extraction of Solvent from Micromachined Structures," Supercritical Fluids, Chapter 18, pp. 255–269, 1997.

Gani et al., "Variable Gratings for Optical Switching: Rigorous Electromagnetic Simulation and Design," Optical Engineering, vol. 38, No. 3, pp. 552–557, Mar. 1999.

Buhler et al., "Linear Array of Complementary Metal Oxide Semiconductor Double–Pass Metal Micromirrors," Optical Engineering, vol. 36, No. 5, pp. 1391–1398, May 1997.

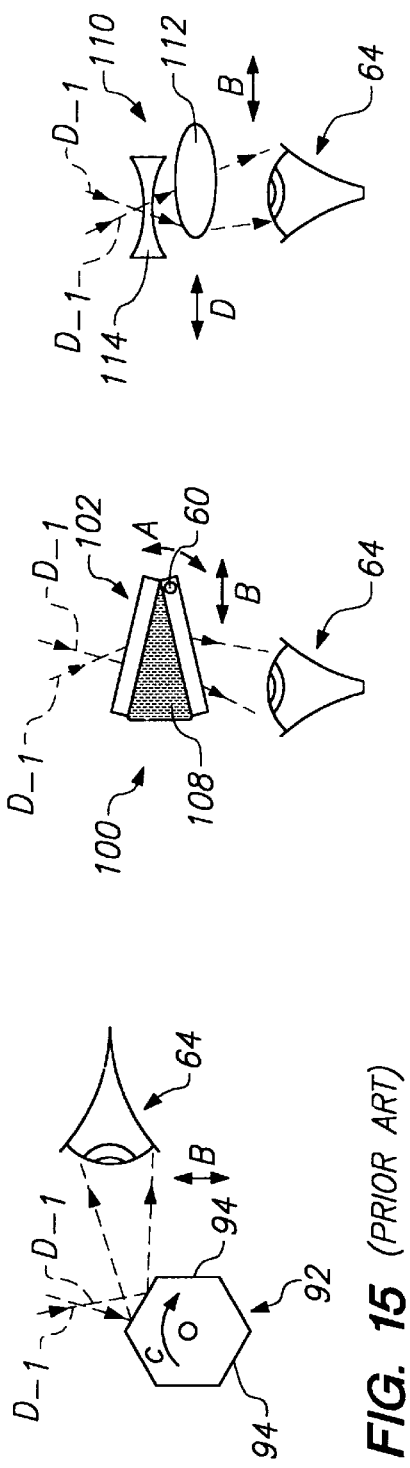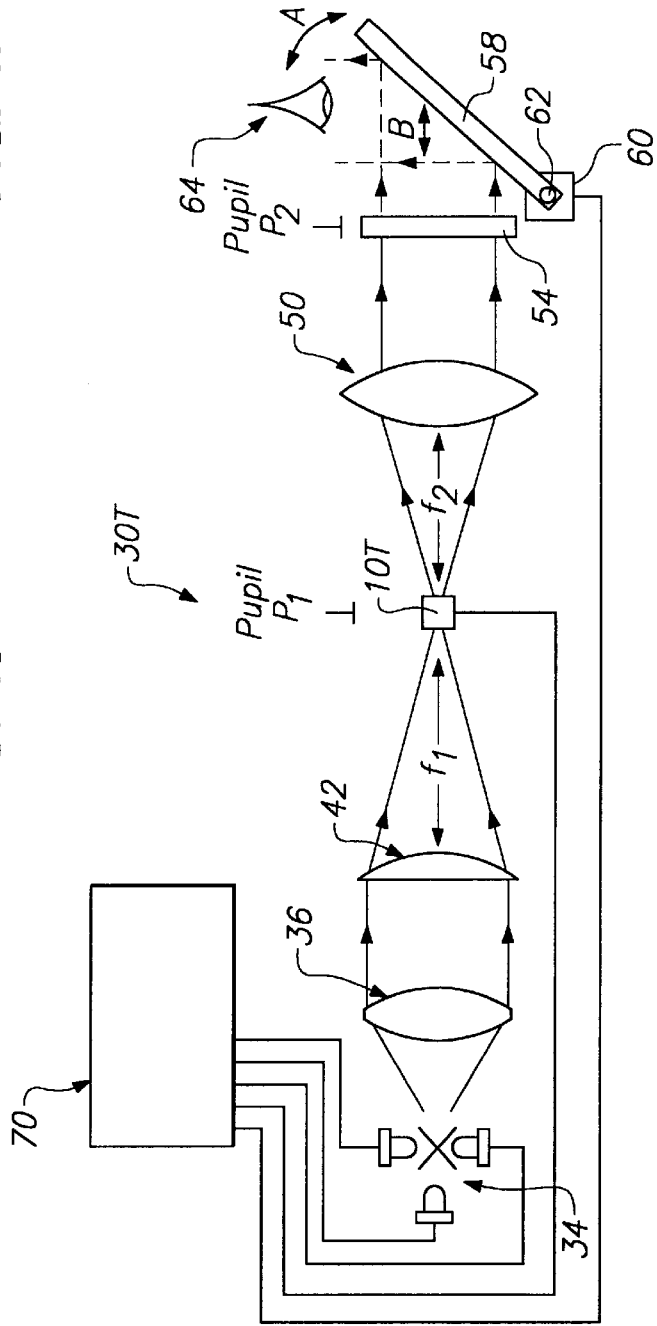

DISPLAY DEVICE INCORPORATING ONE-DIMENSIONAL GRATING LIGHT-VALVE ARRAY

TECHNICAL FIELD OF THE INVENTION

The present invention relates in general to miniature display devices. It relates in particular to a miniature display device wherein light is incident on a linear array of high speed light-valves which diffract and/or reflect the light, diffracted light being directed via magnifying optics and a mechanical scanning arrangement to a viewer, the scanning arrangement causing diffracted light from the light-valves to appear to the viewer as a two-dimensional image.

DISCUSSION OF BACKGROUND ART

Miniature display devices are useful in applications such as portable displays for video simulation applications, among others. A miniature display in the context of this discussion is understood to be a display sufficiently small that it requires an optical magnification arrangement to be effective. An advantage of such a display is that it consumes less power, and occupies much less space than a conventional display having real dimensions equal to the apparent dimensions of the magnified miniature display.

Such miniature displays can be sufficiently small that they can be incorporated in goggles or other eyewear. This may be used to "immerse" a user completely in a displayed environment, in what are popularly termed "virtual reality" interactions with a computer. Such a display may also be worn as an accessory display which allows a user to see his or her real environment in addition to information conveyed by the display. Such an accessory display may be useful, for example, as a display for a telephone operator or an airline ticket agent. Wearing such a display allows a user to maintain a comfortable fixed viewing relationship to the display while being free to move about to perform other activities.

U.S. Pat. No. 4,934,773 describes a miniature full-page video display which includes at least one row of light emitting elements such as light emitting diodes (LEDs), a magnifying lens, and a vibrating mirror in a light-tight box having an opening through which the vibrating mirror may be viewed. The LEDs are selectively illuminated at points in the travel of the vibrating mirror, resulting in rows of pixels or image-elements being projected at selected points on the mirror to provide a two-dimensional image. A head-mounted display system incorporating this miniature display concept is described in U.S. Pat. No. 5,003,300.

The row of such emitters may be formed on a single semiconductor chip, generally termed a microchip-laser array. Associated driving circuits for the emitters (one for each emitter) may be formed on the same chip. It is taught in the '773 patent, that by using two or more rows of light emitters, each row emitting a different colored light, a colored display may be achieved A display device as described in the above-discussed patents offers the advantage that, by virtue of the scanning action of the vibrating mirror, a single row of light emitters can be made to do the work of as many such rows of emitters as would be necessary to provide a real two-dimensional display of the same resolution. This provides for a significant reduction in device complexity and cost. Usefulness of such a device is limited however, by a rate at which each light emitter can be modulated. Further, the physical size of LEDs and end-emitting semiconductor laser devices also limits the attainable resolution of such a device.

Notwithstanding the technical progress in miniature display devices to date, it is believed that further improvement of such devices, particularly in the direction of higher resolution and lower power-consumption is required.

SUMMARY OF THE INVENTION

The present invention is directed to a display system for providing a two-dimensional image. In a most general aspect, a display system in accordance with the present invention comprises a diffractive light-valve array. The light-valve array includes a row of elongated, individually-operable, spaced-apart modulator members aligned parallel to each other. Each of the modulator members is operable such that light incident thereon is diffracted to an extent determined by an operational state of the modulator member.

The system includes an illumination arrangement for causing light to be incident on the light-valve array, and an arrangement for separating a diffracted portion of the incident light from a non-diffracted portion of the incident light. Electronic circuitry is provided for receiving video data and operating the modulator members of the light-valve array to correspond to image-elements of the video data to be displayed.

Magnifying optics provide a magnified image of the grating light-valve array, via the separated diffracted light portion, to a viewer. The system includes a scanning device cooperative with the electronic circuitry for scanning the magnified image through the field of view of a viewer to provide sequential lines of the two-dimensional image at a rate sufficient to cause the magnified virtual image to appear to the viewer as the two-dimensional image.

In one preferred embodiment of a display system in accordance with the present invention, the light-valve array is a reflective grating light-valve (GLV) array including a row of spaced-apart, elongated movable reflective-members aligned parallel to each other. Each of the movable reflective-members is individually movable, with respect to a corresponding fixed reflective-member, through planes parallel to and separated from a plane in which the fixed reflective-member is located. The movable and fixed reflective-members are configured such that corresponding movable and fixed reflective-members, together, cause diffraction and/or reflection of light incident thereon to an extent depending on the planar separation of the movable and fixed reflective-members.

The magnifying optics includes a magnifying lens for providing the magnified image. The magnifying lens, the light-valve array, and the arrangement for separating diffracted light from reflected light are configured as a telecentric system with the light-valve array and the diffracted light separating arrangement located at respectively a telecentric object position and an exit pupil of the magnifying lens.

The magnifying lens is preferably an eyepiece lens of a type selected from the group of eyepiece lens types consisting of Huygens, Ramsden, Kellner, Plössel, Abbe, König, and Erfle. The magnifying lens may be arranged to provide a magnified virtual image of the light-valve array for direct viewing through the lens by a viewer. The magnifying lens may also be arranged to project a magnified real image of the light-valve array on a receiving surface such as a screen.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIG. 7 is a general cross-section view schematically illustrating a projection lens cooperative with the eyepiece lens of FIG. 4, for projecting a real image of the GLV of FIG. 4 on a screen, recording medium, paper, or the like.

FIG. 15 is a general cross-section view schematically illustrating a rotating-polygon reflective scanning arrangement for use in the systems of FIGS. 4 and 6.

FIG. 16 is a general cross-section view schematically illustrating a variable-angle prismatic scanning arrangement for use in the systems of FIGS. 4 and 6.

FIG. 17 is a general cross-section view schematically illustrating a translating-lens transmissive scanning arrangement for use in the systems of FIGS. 4 and 6.

FIG. 18 is a general elevation view schematically illustrating a display system in accordance with the present invention including a transmissive diffractive light-valve array.

DETAILED DESCRIPTION OF THE INVENTION

Figure 2:
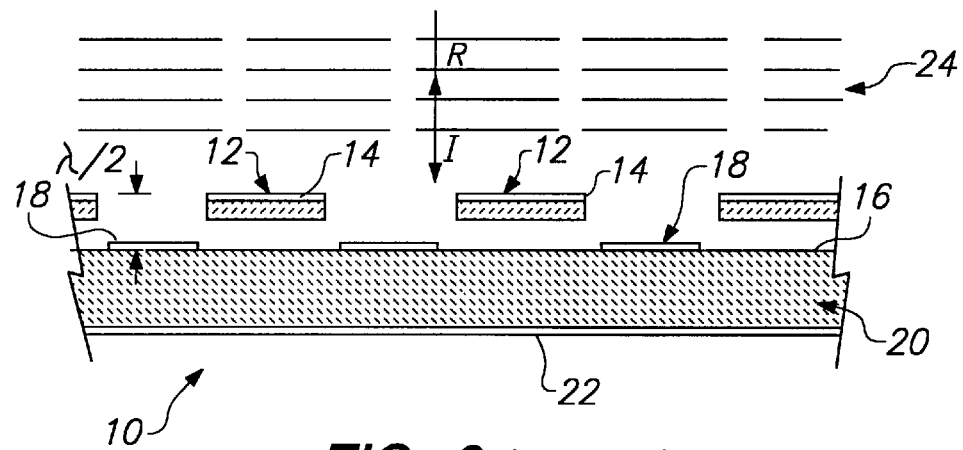
FIG. 2 is a general cross-section view schematically illustrating an operational state of the grating light-valve array portion of FIG. 1 wherein the array portion behaves as a reflector.
Figure 3:
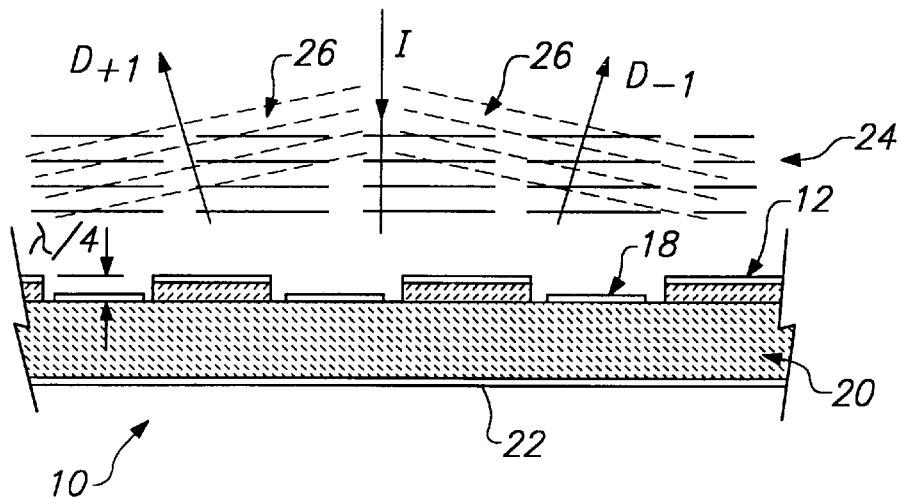
FIG. 3 is a general cross-section view schematically illustrating an operational state of the grating light-valve array portion of FIG. 1 wherein the array portion behaves as a diffraction grating.

In a display system in accordance with the present invention, a particularly preferred light modulating device is a reflective grating light-valve (GLV) array. Use of such devices in real two-dimensional arrays for making displays has been proposed, and devices are described in detail in U.S. Pat. No. 5,459,610, the disclosure of which is hereby incorporated by reference. This type of reflective grating light-valve array is capable of providing displays of very high resolution, by virtue of very small feature or element size, very high switching speeds, and high bandwidth. A brief description of one embodiment of such a device is set forth below with reference to FIGS. 1, 2, and 3.

Figure 1:
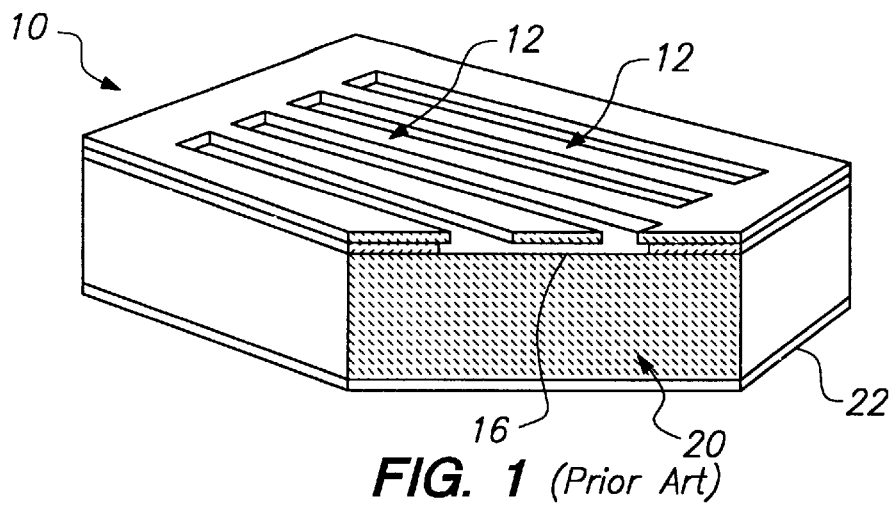
FIG. 1 is a fragmentary perspective view, schematically illustrating a portion of one example of a prior art reflective/diffractive grating light-valve array suitable for use in a display system in accordance with the present invention.

FIG. 1 illustrates a portion 10 of one example of a reflective grating light-valve array. Array 10 includes individually movable elongated reflective-members or ribbons 12 including a reflective coating 14 (see FIG. 2). Ribbons 12 in a non-operating state are suspended (in tension) over a base 16 in a plane parallel thereto. Ribbons 12 are spaced apart and parallel to each other. Ribbons 12 may be referred to as "active" reflective-members of GLV array 10. Aligned with spaces between ribbons 12 are fixed reflective-members 18, formed by depositing a reflective coating on base 16. Fixed reflective-members 18 may be alternately referred to as "passive" members of GLV array 10.

Array 10 is fabricated using lithographic semiconductor device fabrication techniques on a silicon (wafer) substrate 20. Base 16 is one surface of the wafer. An electrode layer 22 is deposited on an opposite surface of the wafer. Ribbons 12 and fixed reflective-members preferably have a width between about one and four micrometers and a length between about 40.0 and 100.0 micrometers ($\mu$m). An array 10 suitable for use in a display in accordance with the present invention preferably has a length on about one centimeter (cm). Such an array would include more than one-thousand movable members 12. The narrow width of the fixed and movable members is such that a group of adjacent members, for example, a group of eight fixed and movable member pairs, can be used to represent one image-element or pixel, in one of two-hundred-fifty-six grey shades, while still providing a pixel small enough to provide resolution comparable to a conventional CRT computer monitor.

A ribbon 12 is moved or operated by applying a potential between the member and base 16. In a non-operated state, the distance between reflective coating 14 of the movable member, and a corresponding (adjacent) fixed member 18, is set to one-half wavelength of light which is used to illuminate the array (see FIG. 2). In this state, a normally incident plane wave-front 24 undergoes no diffraction, and is reflected in a direction opposite the direction of incidence as illustrated by arrows I and R.

When a sufficient potential is applied, a ribbon 12 is deflected towards and can be held on base 16. The thickness of ribbons 12 is selected such that in this "operated and held" state, the distance between reflective surfaces of corresponding fixed and movable members is one-quarter wavelength of light which is used to illuminate the array (see FIG. 3). In this state, destructive interference between light reflected from movable and fixed members creates diffracted wave-fronts 26 (only plus and minus first order diffracted wave-fronts shown in FIG. 3) which propagate at an angle to the incident plane wavefront direction, as illustrated by arrows $D_{+1}$ and $D_{-1}$.

Any adjacent pair of movable and fixed reflective-members 12 and 18, or any functional group of such pairs, representing all or part of an image element, may be considered to be a "light-valve". It is from this consideration that the terminology grating light-valve (GLV) array is adopted for purposes of this description.

Figure 2A:
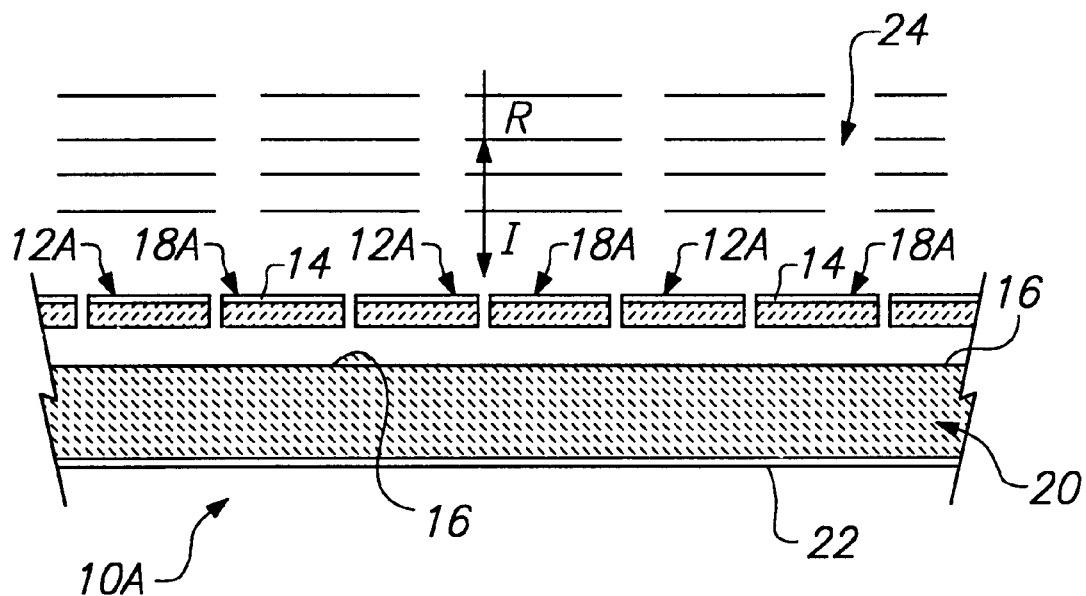
FIG. 2A is a general cross-section view schematically illustrating an operational state of a portion of another example of a grating light valve array wherein the array portion behaves as a reflector.

It is also possible to fabricate a GLV array similar to array 10 discussed above but wherein all reflective-members thereof are suspended in tension above base 16. This is illustrated in FIG. 2A. Array 10A is arranged, via address lines and the like (not shown) such that alternate ones 12A thereof are moveable to provide spatial light modulation and are the equivalent of active members of GLV array 10. Reflective-members 18A (each including a reflective coating 14) in between each of the active members are not moved during operation of GLV array 10A for spatially modulating light and are the equivalent of the fixed or passive members 18 of GLV array 10.

Figure 3A:
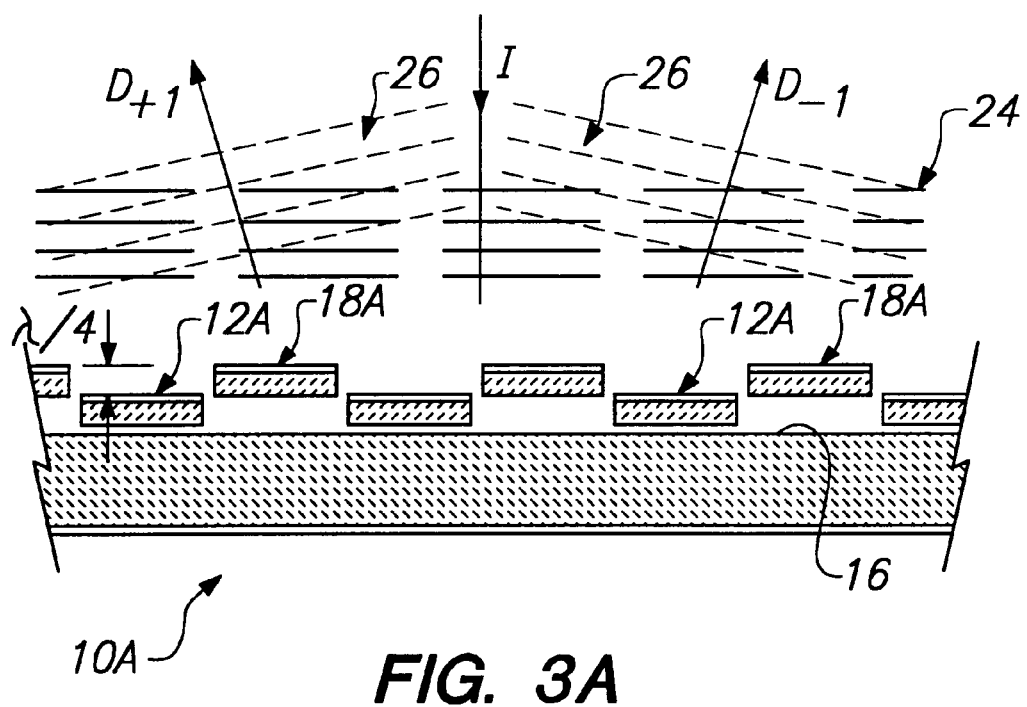
FIG. 3A is a general cross-section view schematically illustrating an operational state of the grating light-valve array portion of FIG. 2A wherein the array portion behaves as a diffraction grating.

GLV array 10A is preferentially arranged such that in a non-operational state. All reflective-members thereof, both active and passive, have reflecting surfaces which lie in the same plane as illustrated in FIG. 2A wherein GLV only reflects light incident thereon. GLV 10A is also preferentially arranged such that when active or moveable members 12A thereof are deflected such that when they lie in an extreme plane separated by one-quarter wavelength from the plane of the moveable or active members, as illustrated in FIG. 3A, they do not contact base 16.

An array of the type exemplified by GLV array 10A is easier to fabricate than an array of the type exemplified by GLV array 10, and can be made using only two lithographic steps. Having moveable members not contact base 20 avoids a potential problem of members "sticking" to base 20 and thereby compromising operation of the array. Further details of GLV array 10A and similar arrays are discussed in co-pending application application Ser. No. 08/482,188, filed Jun. 7, 1995, and assigned to the assignee of the present invention, the complete disclosure of which is hereby also incorporated by reference.

Those familiar with the art to which the present invention pertains will recognize that, in both GLV array 10 and GLV array 10A, as ribbons 12 and 12A move through planes parallel to base 16, in states between the extreme states illustrated in FIGS. 2 and 3, and FIGS. 2A and 3A, light will be both reflected and diffracted. Intermediate states may be used to operate the members in an analog manner.

Whether ribbons 12 are operated in a binary manner, (held in one of the extreme states of FIGS. 2 and 3 with states in a group, binary weighted to provide grey scale), or in an analog manner, in a full-length, single-row or one-dimensional array, representing one resolution or scan line of a two-dimensional image, different portions of the array will have members in different states, such that incident light returned from the array will contain diffracted and non-diffracted (reflected) portions.

In a display system in accordance with the present invention, the diffracted light portion is used to present a two-dimensional image to a viewer. Because of this, a system in accordance with the present invention must include an arrangement for separating the diffracted light portion from the reflected light portion. Preferred examples of such arrangements are discussed in detail below in descriptions of preferred embodiments of the present invention. These optical arrangements are of a type known generally in the optical art as Schlieren optics which typically separate reflected from diffracted light by an arrangement of one or more lenses and one or more stops such that reflected light is blocked from the field of view of a viewer.

Figure 4:
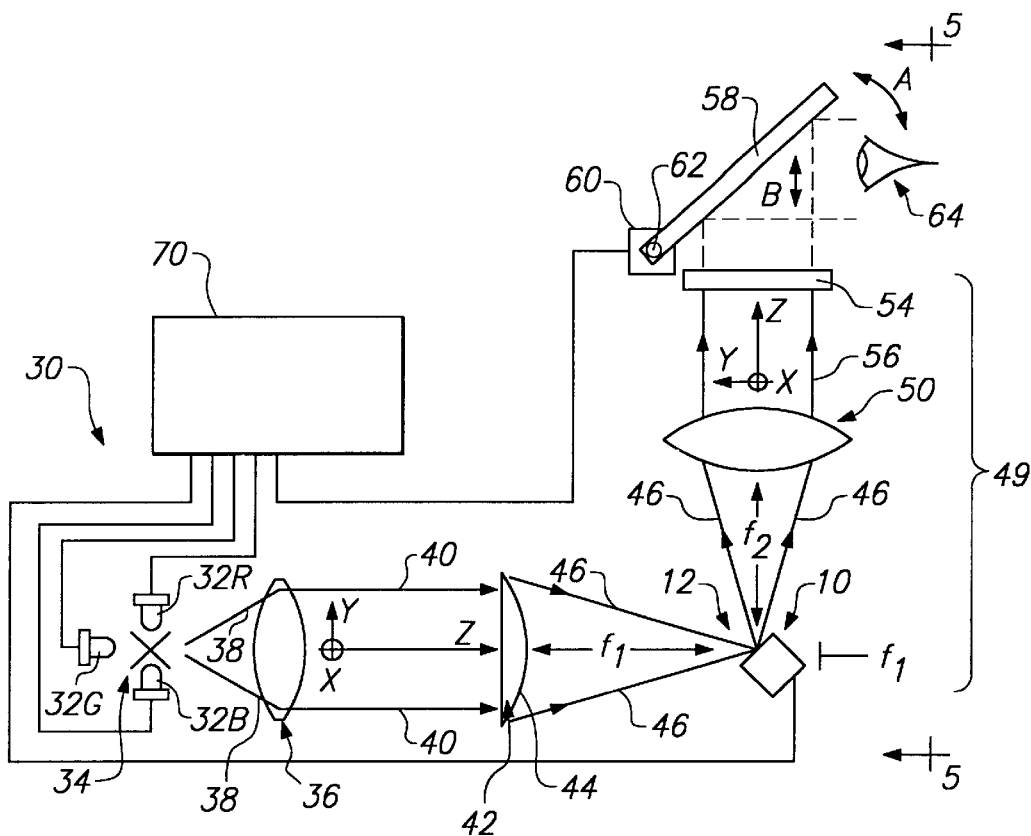
FIG. 4 is a general cross-section view schematically illustrating one preferred embodiment of a display system in accordance with the present invention including an illumination arrangement for causing light to be incident on a reflective grating light-valve array (GLV), a magnifying eyepiece lens, an exit pupil stop for separating diffracted light from the GLV from light reflected from the GLV) and a scan mirror for scanning the separated diffracted light across the field of view of a viewer.
Figure 5:
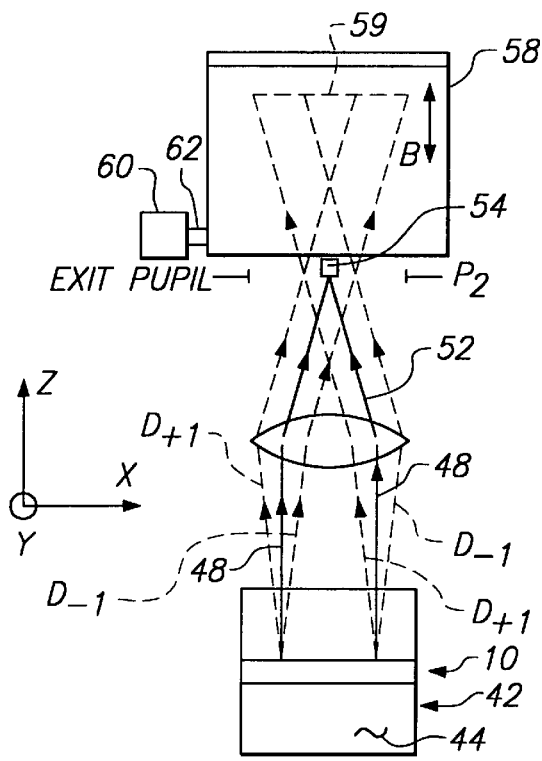
FIG. 5 is a general cross-section view seen generally in a direction 5—5 of FIG. 4, schematically illustrating the GLV, magnifying eyepiece lens, exit pupil stop and scanning mirror of FIG. 4.

Referring now to FIG. 4 and FIG. 5, one preferred embodiment 30 of a display system in accordance with the present invention is illustrated. In display system 30 an illumination arrangement for illuminating a GLV array 10, includes red, green, and blue light sources 32R, 32G and 32B respectively. Preferably, these light sources are semiconductor light emitting devices such as LEDs or semiconductor lasers. In cases where a very large display is to be projected it may even be found advantageous to use solid-state lasers or optical parametric oscillators having an appropriate emission wavelength.

In system 30, light sources 32R, 32G, and 32B are assumed to be light sources, such as LED's, which emit in a generally symmetrical manner. A dichroic filter group 34 allows light from any one of these light sources to be directed toward a collimating lens 36 propagating generally along a system optical axis z. Dichroic filter groups which cause three light sources of different color to appear to an optical system to emanate from the same point of origin are well known in the optical art, for example, Philips prisms. Accordingly, a detailed description of such dichroic filter groups is not presented herein.

Lens 36 is illustrated, for simplicity as a simple "spherical" lens, i.e having equal refractive power in the x and y axes. In FIG. 4 the y axis is in the plane of the illustration and the x axis is perpendicular to the plane of the illustration. The purpose of the lens is to collimate light from the light source in both axes. Those familiar with the art to which the present invention pertains, will recognize however, that light output from an end-emitting semiconductor laser is more divergent in one transverse (x or y) axis than the other and is astigmatic. Means for collimating the output beam of such a laser and expanding it to a desired size are well-known in the optical art and may require one or more spherical, aspherical, toroidal, or cylindrical (spherical and aspherical) lens elements. Lens 36 is intended to represent a group of one or more such elements.

Divergent light 38 from a symmetrically emitting light source 32 passes through lens 36 and is collimated in both the x and y axes. Bi-axially collimated light 40 is then passed through a cylindrical lens 42. The term "cylindrical" here defining that lens 42 has refractive power in one axis (here, y) only. Those familiar with the optical art will recognize that surface 44 of lens 42 may be other than circularly cylindrical. The function of lens 24 is to cause bi-axially collimated light 40 passing therethrough to converge (FIG. 4, lines 46) in the y axis, and remain collimated (FIG. 5 lines 4&) in the x axis. It should be noted here that lens 42 may also be formed from one of more optical elements as discussed above, and is shown as a single element for simplicity, although usually, a single lens element will suffice.

GLV array 10 is located at a distance from cylindrical lens 42 of about a focal length ($f_1$) of the lens. GLV array 10 is aligned in the x axis, on the system optical axis z which corresponds to the optical axis of lenses 36 and 42. The operating surface of the GLV (ribbons 12) is inclined to the z axis. In FIG. 4, GLV array 10 is inclined at 45° to the axis, which effectively folds the z axis 90°. This selection of inclination of the GLV array is made here for convenience of illustration and should not be considered limiting.

Referring to FIG. 5, light incident on an operating GLV array 10, creates a reflected beam (arrows 48) and plus and minus first-order diffracted beams designated by arrows $D_{+1}$ and $D_{-1}$ respectively. These diffracted beams are inclined to the z axis in the x axis. In the y axis, the diffracted and reflected beams are equally divergent. The diffracted and reflected beams then pass through a magnifying (positive) lens 50 which is separated from GLV array 10 by a focal length $f_2$ of the lens. Lens 50 is shown in FIG. 5 as a single element for simplicity, but in practice lens 50 may include two or more elements. Lens 50 provides in effect an eyepiece lens for system 30 and is preferably one of the well-known group of eyepiece lens types, consisting of Huygens, Ramsden, Kellner, Plössel, Abbe, König, and Erfle types, all of which include two or more lens elements.

In the x axis, the reflected beam converges (arrows 52) to a focal point on the z axis, at which is placed an elongated stop 54 at about an external telecentric exit pupil $P_2$ of lens 50. Thus the Schlieren optics of system 30 can be defined as being a part of a telecentric optical arrangement 49 including GLV array 10 magnifying eyepiece lens 50 and stop 54, with GLV array 10 at about an external object position of lens 50 and stop 54 at about an external (exit) pupil of lens 50. A telecentric system is a system in which the entrance pupil and/or the exit pupil is located at infinity. It is widely used in optical systems designed for metrology because it tends to reduce measurement or position error caused by slight defocusing of the system. This tendency permits some tolerance in placement of stops and other components of the system in general, and specifically exploited in certain embodiments of the present invention discussed further hereinbelow.

In the y axis (see FIG. 4), divergent reflected light 46 (and diffracted light) are collimated by lens 50 as illustrated by arrows 56. Stop 54 is aligned in the y axis, and intercepts the reflected light. Stop 54 may be selected to be absorbing or reflecting. If stop 54 is reflecting, reflected light from the stop is returned to GLV array 10. Diffracted beams $D_{+1}$ and $D_{-1}$, however, being inclined to the z axis and the corresponding incident and reflected beams, converge to focal points above and below (alternatively, on opposite sides of) stop 54 thereby passing through exit pupil $P_2$ without being intercepted by stop 54.

A scanning mirror 58 is located such as to intercept the diffracted beams and direct them toward a viewer's eye 64. What the viewer sees is a magnified virtual image (at infinity) of GLV array 10. This image is represented whimsically in FIG. 5 by line 59, recognizing, of course, that there is no real image here.

Operable members of GLV array 10 are operated to represent, sequentially, different lines of a M×N display where M is the number of image-elements per line, and N is the number of (resolution) lines in the display. An image element may include one or more operable GLV members, as discussed above. GLV array 10 may be defined generally as representing, a one-dimensional array of light valves, or one row of image-elements or pixels. In the magnified virtual image these pixels will have a relative brightness determined by the operating state of ribbon or ribbons 12 of GLV array 10.

Scanning mirror 58 is moved, angularly, by a drive unit 60 about an axis 62 as illustrated by arrow A (see FIG. 4), scanning the diffracted beams, and thus the magnified virtual image, linearly, across the field of view of the viewer, as indicated by arrow B, to represent sequential lines of the display. Mirror 58 is moved fast enough to cause the scanned virtual image to appear as a two-dimensional image to the viewer.

Microprocessor-based electronic control circuitry 70 is arranged to accept video data via a terminal 72, and is connected to GLV array 10 for using that data to operate moving members of GLV array 10 for modulating light thereon. The circuitry is arranged such that light in diffracted beams $D_{+1}$ and $D_{-1}$ is modulated to represent sequential resolution lines of a two-dimensional image representing the video data, as noted above. Control circuitry 70 is also connected to scanning mirror drive unit 60 to synchronize the display of sequential lines and to provide that sequential frames of the image begin at an extreme of the angular excursion range of scanning mirror 58. Control circuitry 70 is also connected to light sources 32R, 32G, and 32B and switches the sources sequentially cooperative with operation of GLV array 10 to provide sequential red, green and blue resolution images of the array, which, together, represent one resolution line of a colored two-dimensional image.

It should be noted here that in FIG. 4 viewer's eye 64 is illustrated in a less than ideal system for properly viewing a magnified virtual image of the display of system 30. Ideally, for viewing such an image, the viewer's eye should be located at about exit pupil P2. This is difficult because of mirror 58, which is preferably also located at about this exit pupil. This difficulty can be overcome by optically relaying an image of the exit pupil away from the mirror, to a position at which it is easy to locate a viewer's eye, thereby allowing the scanning mirror and the viewers eye each to be located at about a pupil position.

Figure 6:
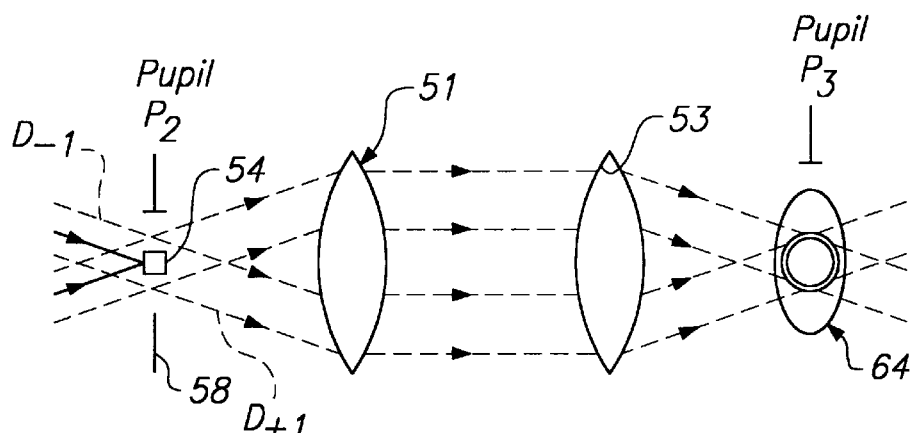
FIG. 6 is a general cross section view schematically illustrating a telecentric relay arrangement for an exit pupil of the eyepiece lens of the system of FIG. 4.

One means of relaying an image of exit pupil $P_2$ is illustrated in FIG. 6 wherein the optical arrangement is shown as optically "unfolded", with scanning mirror 58 represented as a line at exit pupil P2 of lens 50, that being one preferred position for the scanning mirror. Here pupil-relaying is accomplished by two lenses 51 and 53 of the same focal length, which are spaced apart by a distance equal to twice that focal length to form a unit magnification telecentric relay which places an image $P_3$ of exit pupil $P_2$ a focal length of lens 53 away from the lens, providing adequate eye-relief from lens 53. Those skilled in the optical art will recognize, of course, that lenses 51 and 53 may include more than one lens element, and further, that the telecentric relay arrangement illustrated in FIG. 6 is not the only possible optical arrangement for relaying a pupil image.

Figure 7:
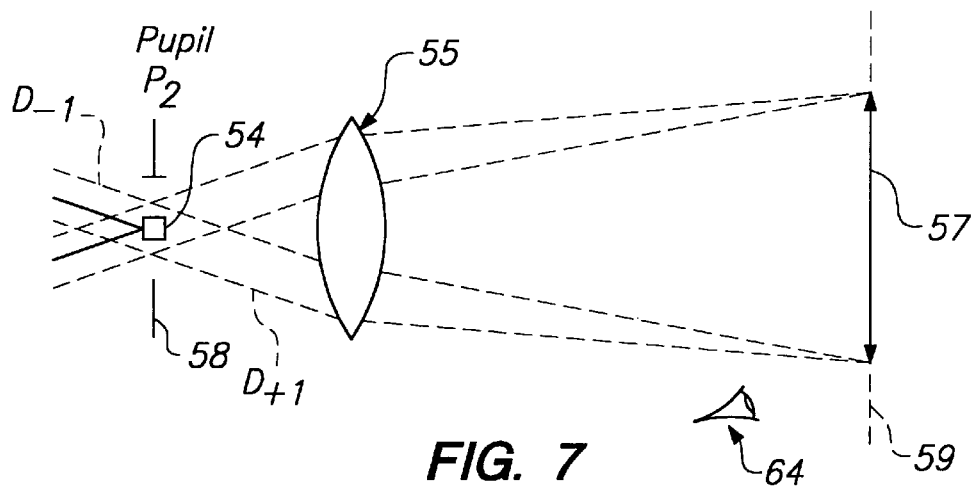

Referring now to FIG. 7, (where again the optical system is illustrated as "unfolded" with scanning mirror 58 represented as a line at exit pupil P2 of lens 50, that being, here also, one preferred position for the scanning mirror) eyepiece lens 50 may also be used as one element, or group of elements, for projecting a magnified real image of GLV on a screen or on a recording medium, such as would be required to provide a projection display or a device for recording or printing an image. Here, a lens (or group of lens elements) 55 is positioned to focus a magnified real image 57 (here, the width) of GLV array 10 at a finite distance from lens 55. This image could be focussed in a plane 59 which could be a viewing screen for providing a projected (apparent) two-dimensional image, or on a recording medium such as photographic film, or paper. In the case of a recorded or printed image, scan mirror 58 could be eliminated, and scanning achieved by moving a recording or printing medium in the scan direction, which, in FIG. 7, is perpendicular to the plane of the illustration, i.e., perpendicular to the orientation of the image. Scanning motion would, of course, still need to be synchronized with image generation by electronic circuitry 70 as in system 30, in order that sequential image lines of a two-dimensional could be printed or recorded.

Referring now to FIGS. 8, 9, 10, and 11, another embodiment 31 of a display system in accordance with the present invention is illustrated. An illumination arrangement includes light sources 32R, 32G, and 32B, spherical lens 36, and cylindrical lens 42, which are, and function, as described above for the same components of display system 30. Bi-axially collimated light 40 is converged (arrows 46) by cylindrical lens 42 in the y axis and remains collimated in the x axis (see FIG. 9). A elongated mirror 80 inclined at 45° to the z axis, on the z axis, and aligned in the x axis. Mirror 80 forms a telecentric stop for cylindrical lens 42. Converging light 46, diverges after being reflected from mirror 80. Collimated light 40 remains collimated.

Lens 50, is in the path of this reflected light and located at about one-focal length of the lens from mirror 80. Thus, after passing through the lens, collimated rays converge, and diverging rays are collimated forming an image of mirror 80 aligned in the y axis, on the z axis. GLV array 10 is located about one focal length of lens 50 away from lens 50, aligned in the y axis, on the z axis. The GLV array thus intercepts this image and is illuminated thereby.

A reflected beam, and plus and minus first-order diffracted beams $D_{+1}$ and $D_{-1}$ return from GLV array 10. The reflected beam returns along its original path through lens 50 and is imaged back onto mirror 80, and then directed back along the incident light path towards lens 42. Reflected light is thus prevented from reaching the viewer. Diffracted beams $D_{+1}$ and $D_{-1}$ converge in the y axis (see FIG. 8) and are collimated in the y axis (see FIG. 9) and thus pass above and below mirror 80 in the y axis. Scanning mirror 58 is arranged to intercept diffracted beams $D_{+1}$ and $D_{-1}$ for scanning diffracted beams $D_{+1}$ and $D_{-1}$ across the field of view of viewer 64 (see FIG. 11) as described above for system 30.

In system 31, lens 50 and GLV array 10 together form a unit magnification folded telecentric relay 79 for light from mirror 80. Lens 50 functions, in the incident light direction, as part of the illumination arrangement for GLV array 10 in addition to providing (in the direction of reflected and diffracted light) a magnified virtual image of that array to a viewer (as a second lens in the telecentric relay). GLV 10 array is located at about an internal pupil $P_1$ of the telecentric relay. Mirror 80 is located at the (diffracted and reflected light) exit pupil $P_2$ of lens 50.

Alternatively, from the point of view of diffracted and reflected light from GLV array 10, a telecentric optical system 81 (Schlieren optics) is formed by GLV 10, lens 50, and stop 54, with GLV 10 at external object position of lens 50 and stop 54, at an (external) exit pupil of lens 50. This is the same arrangement as found in above described display system 30.

An advantage of the folded telecentric relay of system 31 is that is an exactly symmetrical optical system, which is inherently free of odd aberrations such as coma. This thus permits precise reimaging of mirror 80, in reflected light from GLV array 10, back on itself. This makes possible a high contrast ratio for a display provided by the system. Another advantage is that the telecentric relay is exactly symmetrical, whatever the form of magnifying eyepiece lens, this permits for flexibility in selecting a particular eyepiece form and optimization preference therefor, without significantly compromising reimaging the reflected light, and thus contrast ratio. The eye-relief relay, and projector/printer arrangements of FIGS. 6 and 7 are also applicable to display system 31.

Figure 8:
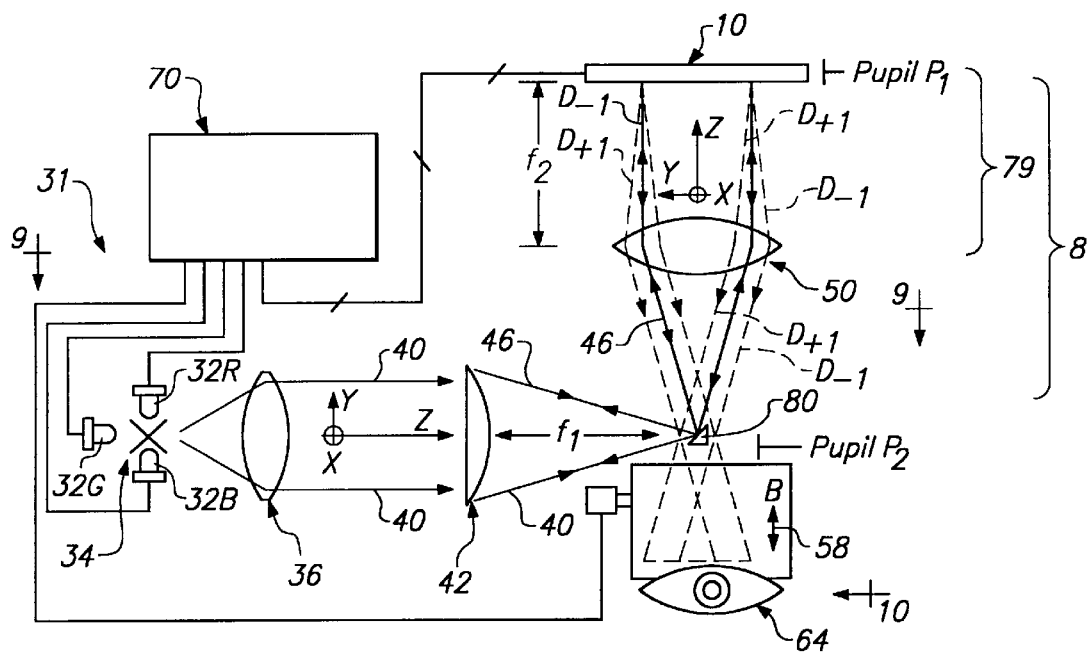
FIG. 8 is a general cross-section view schematically illustrating one preferred embodiment of a display system in accordance with the present invention including source, an illumination arrangement for causing light to be incident on a reflective grating light-valve array (GLV array), a magnifying eyepiece lens, a focal-stop for separating diffracted light from the GLV array from light reflected from the GLV array, and a scan mirror for scanning the separated diffracted light across the field of view of a viewer.
Figure 8A:
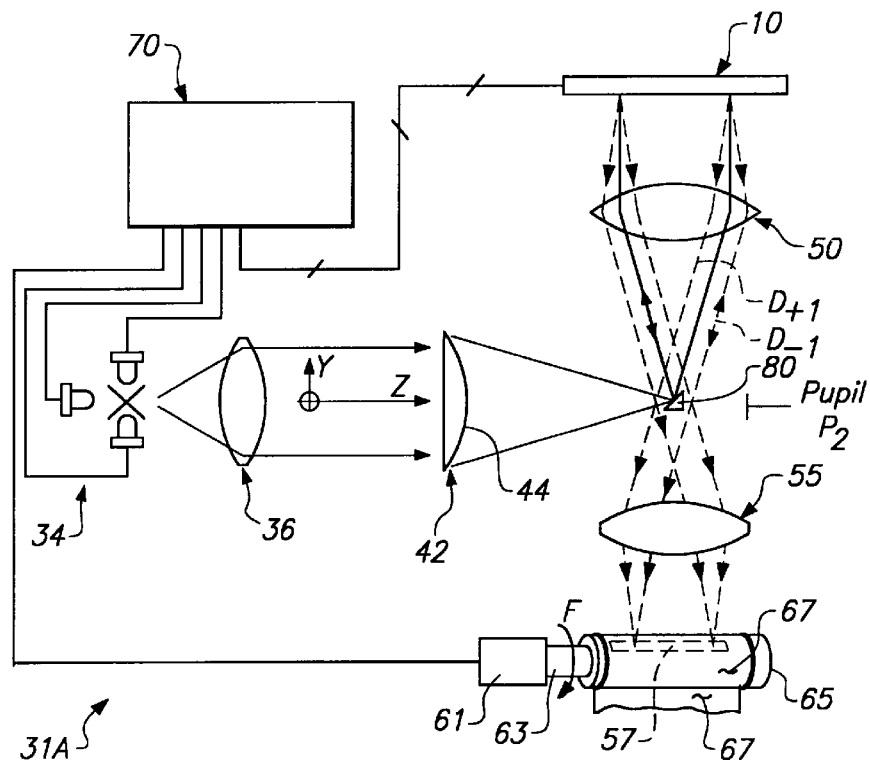
FIG. 8A is a general cross-section view schematically illustrating a system of the type depicted in FIG. 8 arranged as a projection printer, with the scan mirror of FIG. 8 replaced by a drum scanner for moving a printing or recording medium past a stationary projected real image of the GLV array.
Figure 9:
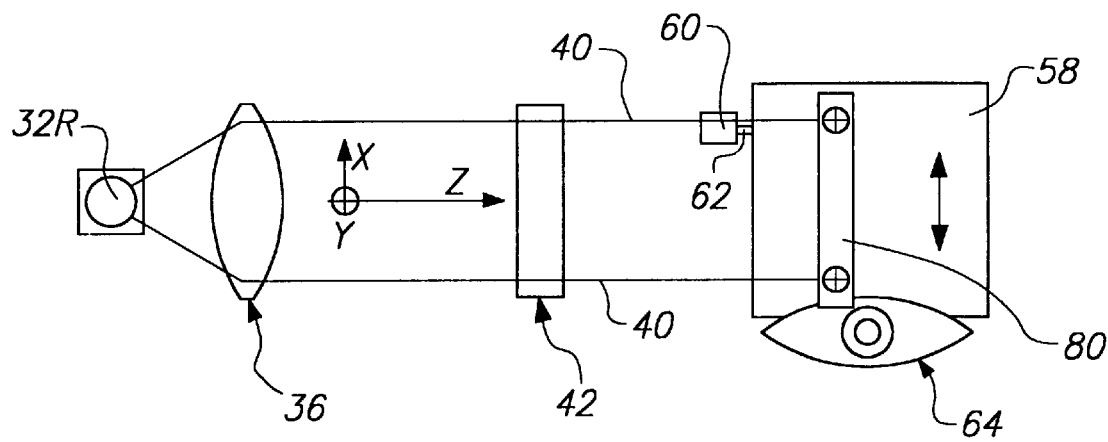
FIG. 9 is a general cross-section view seen generally in a direction 9—9 of FIG. 8 schematically illustrating a portion of the illumination system of FIG. 8.
Figure 10:
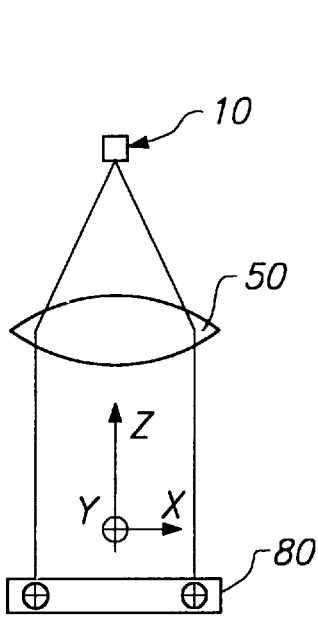
FIG. 10 is a general cross-section view seen generally in a direction 10—10 of FIG. 8 schematically illustrating another portion of the illumination system of FIG. 8.
Figure 11:
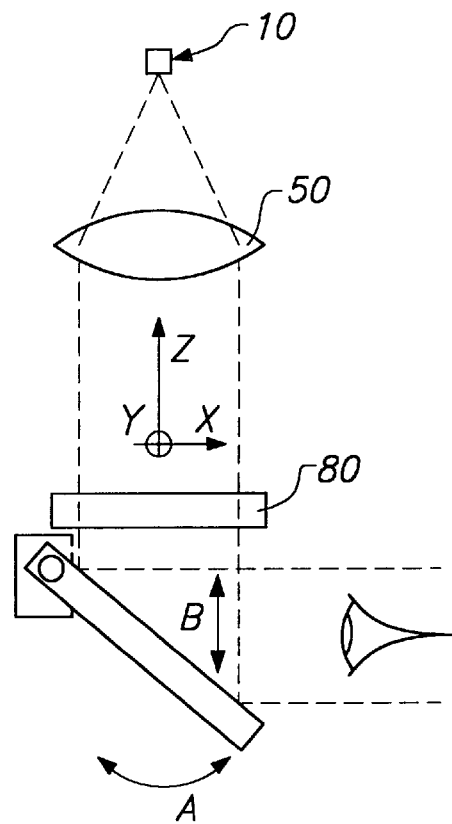
FIG. 11 is a general cross-section view seen generally in a direction 10—10 of FIG. 8 schematically illustrating the path of a light beam diffracted from the GLV array of FIG. 8.

By way of example, in FIG. 8A a system 31A is illustrated which is essentially system 31 with scanning mirror 58 omitted, a projection lens 55 added (see FIG. 7). A drum arrangement 65 is provided for holding and scanning a printing medium 67 or the like. Drum 65 (and medium 67 thereon) is rotated by a motor 61, cooperative with electronics 70, and an axle 63 as indicated by arrow F. Real image 57 (see also FIG. 7) is thus scanned over the surface of the medium to print or record two-dimensional image. Drum scanner 65 is illustrated here for simplicity. Those skilled in the art to which the present invention pertains will recognize that more complex scanning and arrangements are required for sheet-feed printers, for example the scanning engine and toner development arrangements of commercially available laser printers. As such arrangements are well-known in the art, a detailed description of such a complex arrangement is not presented herein.

In system 31, because lens 50 also functions to focus light on GLV array 10 to be spatially modulated, it is important that the eyepiece be capable of focussing as much light as possible, for providing the brightest possible display, and also of providing good image quality. In this regard, a particularly preferred group of eyepiece types are the Kellner, Plössel, and Erfle types, all of which have a relatively wide field. An advantage of lens 50 having a wide field is that it can have an entrance pupil wide enough to accommodate a plurality of turning mirrors. This is illustrated in FIG. 12, wherein three elongated turning mirrors 80A, 80B, and 80C are stacked, in a "venetian blind" fashion, in the y–z plane, sufficient that light from lens 42 of system 31 does encounter any gaps therebetween, and are preferably spaced apart in the y axis direction such that the gaps therebetween are sufficiently wide to accommodate the largest and smallest diffracted angles of diffracted light from a corresponding light beam incident on GLV array 10.

Mirrors 80B and 80C are located one at the conjugate image position (of the folded telecentric system) of the other.

Thus light reflected from mirror 80B is reimaged on mirror 80C and vice versa. Axially located mirror 80A is reimaged on itself as described above. For a multiple mirror system to be effective, a non-axially located mirror must have a corresponding non-axially located mirror at a conjugate image position. Thus, in a system having only two mirrors, both mirrors must be non-axially located, one at the conjugate image position of the other.

Figure 12:
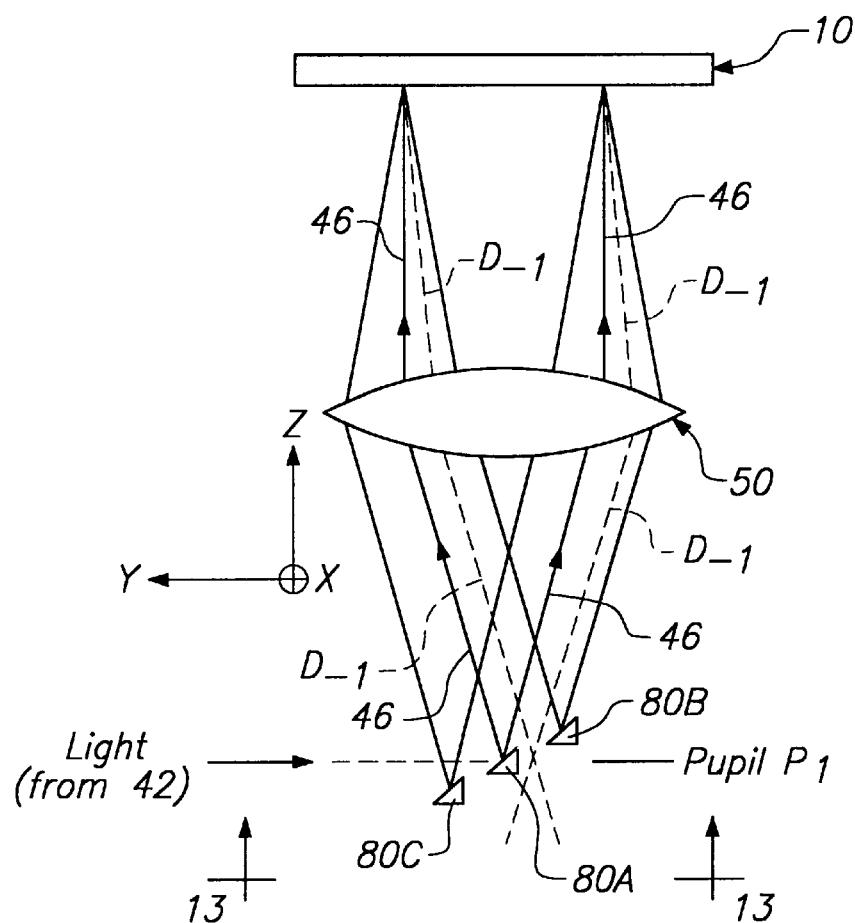
FIG. 12 is a general cross-section view schematically illustrating an arrangement of multiple turning mirrors for the display system of FIG. 8, directing light via a magnifying eyepiece lens of the system of FIG. 8 to the light-valve array of FIG. 8.

For simplicity, only beam D−1 corresponding to incident light beam 46 from mirror 80A is shown in FIG. 12. Those skilled in the optical art will recognize from the illustration how other diffracted beams from mirrors 80B and 80C find their way between or around the mirrors.

Figure 13:
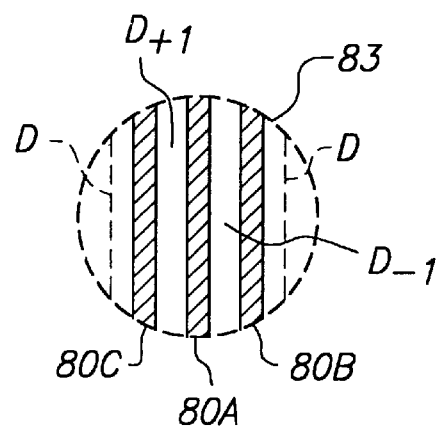
FIG. 13 is a view seen generally in a direction 13—13 of FIG. 12 schematically illustrating the turning mirrors of FIG. 12 in an exit pupil of the magnifying eyepiece lens of FIG. 8.

The effective appearance of the entrance pupil $P_1$ (and the exit pupil $P_2$, which is coincident with the entrance pupil by way of the telecentric arrangement) of lens 50 is shown in FIG. 13, wherein dotted circle 83 represents the "theoretically available" pupil. The shaded areas 80A–C represent that area of the pupil available for light input to GLV array 10, and the un-shaded area between dotted lines $D_{+1}(C)$ and $D_{-1}(B)$ represents the area of the pupil available for output of diffracted light, lines $D_{+1}(C)$ and $D_{-1}(B)$ being defined by the highest diffracted angles from light incident from mirrors 80C and 80B respectively.

Figure 14:
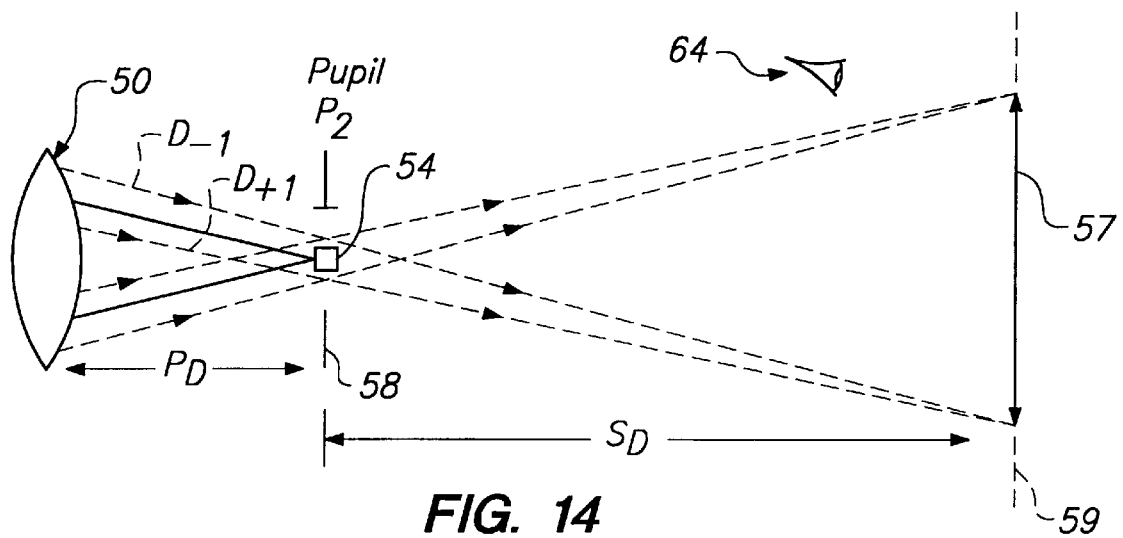
FIG. 14 is a general cross-section view schematically illustrating the magnifying eyepiece lens of FIG. 4 or FIG. 8 used as a projection lens for projecting a real image of the grating light-valve array on a receiving surface.

Eyepiece lens 50 can be optimized such that if GLV array 10 is slightly displaced from the telecentric object position of lens 50 (further from lens 50), in either the system 30 or system 31, reflected light from GLV array 10 will still respectively image or reimage with sufficient accuracy on respectively stop 54 or turning mirror 80, such that the stop or mirror can separate reflected from diffracted light, while diffracted light passing through the exit pupil of lens 50 will converge to form a real, well-corrected, image of GLV array 10 without the need for an additional projection lens group. Such an arrangement is illustrated in FIG. 14 wherein, as in FIGS. 6 and 7, the optical system is illustrated as "unfolded", with scanning mirror 58 represented as a line at exit pupil P2 of lens 50, that being, here also, a preferred position for the scanning mirror. It should be noted here that the distance SD of the screen 59 from exit pupil P2 of lens 50 is shortened relative to the distance PD of the pupil from the lens merely for convenience of illustration. In practice, SD would be more than twenty times greater than PD, such that lines D+1 and D−1 would be barely distinguishable from parallel, and stop 54 could still be described as being at an exit pupil of a telecentric system.

While display system 30 and 31 have been described as employing a scanning mirror which is angularly scanned to provide a linear scanning motion of an image of GLV array 10, this should not be considered limiting. Examples of other scanner arrangements which may be found more or less effective are illustrated in FIGS. 15–17. In FIG. 15, a rotating reflector member 92 provides scanning action. Reflector member 92 has a hexagonal cross-section and has reflective longitudinal faces 94. Light $D_{-1}$ from GLV array 10 and magnifying lens 50 is reflected from a face 94 towards user's eye 64. As reflector member 92 rotates as indicated by arrow C, an image of the GLV array is linearly scanned across the user's field of view as indicated by arrow B.

Referring now to FIG. 16, a prismatic transmissive scanning arrangement 100 includes a deformable or variable-angle prism 102 to provide scanning action. Prism 102 is formed from transparent, plane parallel, front and rear members 104 and 106. Members 104 and 106 are arranged face-to-face at an angle to each other to form a V-shaped trough 108 which is filled with a liquid or preferably with an oil-extended transparent elastomer, preferably having an oil:elastomer ratio greater than 85:15. Such an elastomer is relatively easily deformed, and has an elastic memory, but, despite the high oil proportion, will not flow. Such elastomers and their preparation are discussed in U.S. Pat. No. 4,618,213. Member 106 is angularly scanned or oscillated, as illustrated by arrow A, in the manner of scanning mirror 58 of display systems 30 and 31. This angular motion causes light transmitted through prism 102 to be scanned linearly across a viewer's field of view, as illustrated by arrow B.

Finally, but not exhaustively, yet another scanning arrangement 110 is illustrated in FIG. 17. Scanning arrangement 110 includes positive and negative transparent lens elements 112 and 114 respectively. The radii of curvature of elements 112 and 114 is preferably selected such that the combination of elements has zero optical power. Positive element 112 is driven reciprocally, linearly, as indicated by arrow D. This causes a corresponding linear scan of light across a viewer's field of view as indicated by arrow B. Those familiar with the optical art will recognize of course that element 112 could be fixed and element 114 reciprocated to provide the same scanning mechanism.

While systems in accordance with the present invention have been described with reference to reflective (diffractive) grating light valve arrays, those skilled in the optical art will recognize that principles of the present invention may be embodied in a system including a transmissive (diffractive) light valve array. This is illustrated in FIG. 18 which illustrates a system 30T similar in most respects to system 30 of FIG. 4 but wherein a transmissive (diffractive) light valve array is placed between cylindrical lens 42 and positive lens 50. All other elements of system 30T have the same function as corresponding elements of system 30.

Those skilled in the art to which the present invention pertains will also recognize that principles of the present invention are applicable to providing stereoscopic displays. In a simple arrangement, for example, a stereoscopic display may be formed by providing a GLV array and appropriate separation optics for each eye of a viewer. Those skilled in the art may device other arrangements without departing from the spirit and scope of each invention.

The present invention has been described and depicted in terms of a preferred and other embodiments. The present invention is not limited, however, to those embodiments described and depicted. Rather, the invention is limited only by the claims appended hereto.

What is claimed is:

1. A display system for displaying a two-dimensional image, comprising:
   a diffractive light-valve array, said light-valve array including a row of elongated, individually-operable, spaced-apart modulator members aligned parallel to each other, each of said modulator members for causing diffraction of light incident thereon to an extent determined by an operational state of said operable member;
   illumination means for causing light to be incident on said light-valve array;
   means for separating a diffracted portion of said incident light from a non-diffracted portion of said incident light;
   electronic means for operating said operable elements of said light-valve array to correspond to image-elements to be displayed;
   magnifying lens means for providing a magnified image of said light-valve array, via said separated diffracted, light portion, to a viewer; and scanning means, cooperative with said electronic means, for scanning said magnified image through the field of view of a viewer to represent sequential lines of the two-dimensional image, thereby causing said magnified image to appear to the viewer as the two-dimensional image.

2. The display system of claim 1 wherein said light-valve array is a grating light-valve array and said movable members are reflective, each of said movable reflective-members individually movable with respect to a corresponding fixed reflective-member, through planes parallel to and separated from a plane in which said fixed reflective-member is located, such that said corresponding movable and fixed reflective-members together cause diffraction and/or reflection of light incident thereon depending on the planar separation of said movable and fixed reflective-members.

3. The display system of claim 1, wherein said magnified image of said light valve array is a virtual image and is viewed by said viewer through said magnifying lens means.

4. The display system of claim 1, wherein said magnified image of said light valve array is a real image projected by said magnifying lens means for imaging onto a receiving surface viewable by the viewer and is scanned by said scanning means over said receiving surface.

5. A display system for displaying a two-dimensional image, comprising:

a light-valve array, said light-valve array including a row of elongated, individually-operable, spaced-apart modulator members aligned parallel to each other, each of said modulator members for causing diffraction of light to an extent determined by an operational state of said modulator member;

illumination means for causing light to be incident on said light-valve array;

means for separating a diffracted portion of light from said light-valve array from a non-diffracted portion of light from said light-valve array;

electronic means for operating said operable elements of said light-valve array to correspond to image-elements to be displayed;

magnifying lens means for providing a magnified image of said light-valve array, via said separated diffracted, spatially-modulated light portion, to a viewer;

scanning means, cooperative with said electronic means, for scanning said magnified image through the field of view of the viewer to represent sequential lines of the two-dimensional image, thereby causing said magnified image to appear to the viewer as the two-dimensional image; and said magnifying lens means, said light-valve array, and said diffracted light separating means arranged as a telecentric system with said light-valve array and said diffracted light separating means located at about respectively a telecentric object position and an exit pupil of said magnifying lens means.

6. The display system of claim 5 wherein said magnifying lens means is an eyepiece lens.

7. The display system of claim 5 wherein said eyepiece lens is of a type selected from the group of eyepiece lens types consisting of Huygens, Ramsden, Kellner, Plössel, Abbe, König, and Erfle.

8. The display system of claim 5 wherein said light-valve array is a transmissive diffractive light-valve array.

9. The display system of claim 5 wherein said magnified image is a virtual image viewed by the viewer through said magnifying lens.

10. The display system of claim 9 wherein said scanning means is located at about said exit pupil of said magnifying eyepiece lens means.

11. The display system of claim 10, further including an optical relay arranged in the path of light exiting said scanning means, for providing an image of said exit pupil remote from said scanning means.

12. The display system of claim 5 wherein said magnified image is a real image and is projected by said magnifying lens for imaging onto a receiving surface viewable by the viewer.

13. The display system of claim 12 wherein said receiving surface is a viewing screen.

14. A display system for projecting a two-dimensional image, comprising:

a light-valve array, said light-valve array including a row of elongated, individually-operable, spaced-apart modulator members aligned parallel to each other, each of said modulator members for causing diffraction of light to an extent determined by an operational state of said operable member;

illumination means for causing light to be incident on said light-valve array;

means for separating a diffracted portion of light from said light-valve array from a non-diffracted portion of light from said light valve array;

electronic means for operating said operable elements of said light-valve array to correspond to image-elements to be displayed;

projection lens means for projecting a magnified real image of said light-valve array, via said separated diffracted, light portion, onto a receiving surface, said projection lens means including first and second lens-element groups;

scanning means, cooperative with said electronic means for scanning said magnified image, through the field of view of a viewer viewing the receiving surface, to represent sequential lines of the two-dimensional image, thereby causing said magnified real image to appear to the viewer as the two-dimensional image; and said first lens-element group, said light-valve array, and said diffracted light separating means arranged as a telecentric system with said light-valve array and said diffracted light separating means located at about respectively a telecentric object position and an exit pupil of said first element group, and said exit-pupil of said first element group located between said first element group and said second element group.

15. The display system of claim 14, wherein said scanning means is located at about said exit-pupil of said first lens-element group.

16. The display system of claim 14 wherein said magnifying lens means is an eyepiece lens.

17. The display system of claim 16 wherein said eyepiece lens is of a type selected from the group of eyepiece lens types consisting of Huygens, Ramsden, Kellner, Plössel, Abbe, König, and Erfle.

18. A display system for providing a two-dimensional image; comprising:

a grating light-valve array including a row of spaced-apart, elongated, movable reflective-members aligned parallel to each other, each of said active reflective-members individually movable with respect to a corresponding passive reflective-member, through planes parallel to a plane in which said passive reflective-member is located, such that said corresponding active and passive reflective-members together cause diffraction and/or reflection of light incident thereon depending on the planar separation of said active and passive reflective-members;

illumination means for causing light to be incident on said grating light-valve array;

means for separating a diffracted portion of light from said grating light valve array from a reflected portion of light from said grating light-valve array;

electronic means for moving said active reflective-members of said grating light-valve array to correspond to image elements to be displayed;

magnifying lens means for providing a magnified virtual image of said grating light-valve array, via said separated, diffracted light portion to a viewer;

scanning means, cooperative with said electronic means, for scanning said magnified virtual image through the field of view of a viewer, thereby causing said magnified virtual image to appear as the two-dimensional image; and said magnifying lens means, said light-valve array, and said diffracted light separating means arranged as a telecentric system with said light-valve array and said diffracted light separating means located respectively at about a telecentric object position and at about an exit pupil of said magnifying lens means.

19. The display system of claim 18, wherein said magnifying lens means is an eyepiece lens.

20. The display system of claim 18, wherein said eyepiece lens is of a type selected from the group of eyepiece lens types consisting of Huygens, Ramsden, Kellner, Plössel, Abbe, König, and Erfle.

21. The display system of claim 18 wherein said scanning means is located proximate said exit-pupil of said magnifying lens.

22. The display system of claim 21, further including optical relay means arranged in the path of light exiting said scanning means, said optical relay for providing an image of said exit pupil remote from said scanning means.

23. A system for printing a two-dimensional image on a print medium; comprising:

a grating light-valve array including a row of spaced-apart, elongated, active reflective-members aligned parallel to each other, each of said active reflective-members individually movable with respect to a corresponding passive reflective-member, through planes parallel to and separated from a plane in which said passive reflective-member is located, such that said corresponding active and passive reflective-members together cause diffraction and/or reflection of light incident thereon depending on the planar separation of said active and passive reflective-members;

illumination means for causing light to be incident on said grating light-valve array;

means for separating a diffracted portion of light from said grating light valve array from a reflected portion of light from said grating light-valve array;

electronic means for moving said active reflective-members of said grating light-valve array to correspond to image elements to be displayed;

magnifying lens means for projecting a magnified real image of said grating light-valve array, via said separated, diffracted light portion onto the print medium;

scanning means, cooperative with said electronic means, for moving the print medium with respect to the said magnified real image such that said magnified real image defines sequential lines of the two-dimensional image at sequential positions on the print medium.

24. The system of claim 23, wherein said magnifying lens means, said light-valve array, and said diffracted light separating means arranged as a telecentric system with said light-valve array and said diffracted light separating means located respectively at about a telecentric object position and at about an exit pupil of said magnifying lens means.

25. The display system of claim 23, wherein said magnifying lens means is an eyepiece lens.

26. The display system of claim 25, wherein said eyepiece lens is of a type selected from the group of eyepiece lens types consisting of Kellner, Plössel, and Erfle.

27. A system for printing a two-dimensional image on a print medium; comprising:

a grating light-valve array including a row of spaced-apart, elongated, active reflective-members aligned parallel to each other, each of said active reflective-members individually movable with respect to a corresponding passive reflective-member, through planes parallel to a plane in which said fixed reflective-member is located, such that said corresponding active and passive reflective-members together cause diffraction and/or reflection of light incident thereon depending on the planar separation of said active and passive reflective-members;

illumination means for causing light to be incident on said grating light-valve array;

means for separating a diffracted portion of light from said grating light valve array from a reflected portion of light from said grating light-valve array;

electronic means for moving said active reflective-members of said grating light-valve array to correspond to image elements to be displayed;

projection lens means for projecting a magnified real image of said grating light-valve array, via said separated, diffracted light portion onto the print medium;

scanning means, cooperative with said electronic means, for moving the print medium with respect to the said magnified real image such that said magnified real image defines sequential lines of the two-dimensional image at sequential positions on the print medium; and said projection lens means including first and second element groups, said first element group forming a positive lens, and said positive lens, said light-valve array, and said diffracted light separating means arranged as a telecentric system with said light-valve array and said diffracted light separating means located between said first and second element groups at about an exit pupil of said positive lens.

28. A display system for displaying a two-dimensional image on a viewing screen comprising:

a. a light source having a light output;

b. a first optical arrangement for cylindrically focusing the light output in a focus line having a focus width;

c. a grating light valve array being modulated by electronic means and having a plurality of diffractive light valves linearly arrayed approximately along the focus line such that the light output couples with the grating light valve array, the grating light valve array forming a combination of a diffracted state and a reflected state, the diffracted state forming a linear image;

d. a magnifying optical arrangement coupled to the combination of the diffracted state and the reflected state;

e. a separating optical arrangement for removing the reflected state from the combination of the diffracted state and the reflected state, the separating optical arrangement allowing a diffracted portion of the diffracted state to pass the separating optical arrangement;

f. a projection optical arrangement for projecting the diffracted portion onto the viewing screen such that the linear image is formed on the viewing screen; and g. a scanning device coupled to the diffracted portion and being driven by the electronic means, the scanning device repeatedly scanning the linear image over the viewing screen in a direction perpendicular to the linear image on the viewing screen such that the linear image forms the two-dimensional image on the viewing screen.

29. The display system of claim 28 wherein the magnifying optical arrangement comprises an eyepiece type lens.

30. The display system of claim 28 wherein the separating optical arrangement comprises a stop.

31. The display system of claim 28 wherein the separating optical arrangement comprises a turning mirror.

32. The display system of claim 28 wherein the projection optical arrangement comprises a projection lens.

33. A display system for displaying a two-dimensional virtual image to a viewer comprising:

a. a light source having a light output;

b. a first optical arrangement for cylindrically focusing the light output in a focus line having a focus width;

c. a grating light valve array being modulated by electronic means and having a plurality of diffractive light valves linearly arrayed approximately along the focus line such that the light output couples with the grating light valve array, the grating light valve array forming a combination of a diffracted state and a reflected state, the diffracted state forming a linear image;

d. a magnifying optical arrangement coupled to the combination of the diffracted state and the reflected state;

e. a separating optical arrangement for removing the reflected state from the combination of the diffracted state and the reflected state, the separating optical arrangement allowing a diffracted portion of the diffracted state to pass the separating optical arrangement; and f. a scanning device being driven by the electronic means, the scanning device being coupled to the diffracted portion such that the scanning device scans the linear image to form the two-dimensional virtual image.

34. The display system of claim 33 wherein the magnifying optical arrangement comprises an eyepiece type lens.

35. The display system of claim 33 wherein the separating optical arrangement comprises a stop.

36. The display system of claim 33 wherein the separating optical arrangement comprises a turning mirror.

37. A display system for displaying a two-dimensional image on a viewing screen comprising:

a. a light source having a light output;

b. a first optical arrangement for cylindrically focusing the light output in a focus line having a focus width;

c. a grating light valve array being modulated by electronic means and having a plurality of diffractive light valves linearly arrayed such that a portion of the light output couples with the grating light valve array, the grating light valve array forming a combination of a diffracted state and a reflected state, the diffracted state forming a linear image;

d. a magnifying optical arrangement coupled to the combination of the diffracted state and the reflected state;

e. a separating optical arrangement for removing the reflected state from the combination of the diffracted state and the reflected state, the separating optical arrangement allowing a diffracted portion of the diffracted state to pass the separating optical arrangement such that the diffracted portion is projected onto the viewing screen and further such that the linear image is formed on the viewing screen; and f. a scanning device coupled to the diffracted portion and being driven by the electronic means, the scanning device repeatedly scanning the linear image over the viewing screen in a direction perpendicular to the linear image on the viewing screen such that the linear image forms the two-dimensional image on the viewing screen.

38. The display system of claim 37 wherein the magnifying optical arrangement comprises an eyepiece type lens.

39. The display system of claim 37 wherein the separating optical arrangement comprises a stop.

40. The display system of claim 37 wherein the separating optical arrangement comprises a turning mirror.

* * * * *

UNITED STATES PATENT AND TRADEMARK OFFICE
CERTIFICATE OF CORRECTION

PATENT NO.    : 5,982,553

DATED         : Nov. 9, 1999

INVENTOR(S)   : David Bloom et al.

It is certified that error appears in the above-identified patent and that said Letters Patent is hereby correct as shown below:

Title page,

In [56], please delete "4,389,086" and insert therefor --4,389,096--.

Column 7, line 15, please delete "4&" and insert therefor --48--.

Column 7, line 50, please delete "array 10" and insert therefor --array 10,--.

Signed and Sealed this

Twenty-fifth Day of July, 2000

Attest:

Q. TODD DICKINSON

*Attesting Officer*    *Director of Patents and Trademarks*